US012615568B2

(12) United States Patent
Tang et al.

(10) Patent No.: US 12,615,568 B2
(45) Date of Patent: Apr. 28, 2026

(54) NETWORK HANDOVER METHOD, TERMINAL DEVICE, AND ACCESS POINT DEVICE FOR PERFORMING HANDOVER BY REUSING AN ESTABLISHED PROTOCOL STACK LINK

(71) Applicant: HUAWEI TECHNOLOGIES CO., LTD., Shenzhen (CN)

(72) Inventors: Guowang Tang, Shanghai (CN); Xianglin Gong, Shanghai (CN); Zhenzhong Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 18/341,839

(22) Filed: Jun. 27, 2023

(65) Prior Publication Data
US 2023/0337091 A1 Oct. 19, 2023

Related U.S. Application Data

(63) Continuation of application No. PCT/CN2020/140424, filed on Dec. 28, 2020.

(51) Int. Cl.
| | |
|---|---|
| *H04W 36/14* | (2009.01) |
| *H04W 36/00* | (2009.01) |
| *H04W 36/16* | (2009.01) |

(52) U.S. Cl.
CPC ....... *H04W 36/14* (2013.01); *H04W 36/0038* (2013.01); *H04W 36/0019* (2023.05); *H04W 36/03* (2018.08); *H04W 36/16* (2013.01)

(58) Field of Classification Search
CPC . H04W 36/14; H04W 36/03; H04W 36/0019; H04W 36/0016
See application file for complete search history.

(56) References Cited

U.S. PATENT DOCUMENTS

| | | | |
|---|---|---|---|
| 9,913,216 B1 * | 3/2018 | Deshpande | ........... H04W 28/14 |
| 10,779,201 B1 | 9/2020 | Indurkar et al. | |

(Continued)

FOREIGN PATENT DOCUMENTS

| | | |
|---|---|---|
| CN | 105828378 A | 8/2016 |
| CN | 107846723 A | 3/2018 |

(Continued)

OTHER PUBLICATIONS

PCT International Search Report for Application No. PCT/CN2020/140424 dated Dec. 28, 2020, 9 pages.

(Continued)

*Primary Examiner* — Kamran Afshar

(57) ABSTRACT

The technology of this application relates to a network handover method, a terminal device, and an access point device. In an example embodiment, the terminal device detects a network parameter of a first Wi-Fi network for connecting the terminal device to the access point device, the terminal device initiates scanning when the network parameter meets a preset condition, and the terminal device obtains authentication information of a second Wi-Fi network if the terminal device obtains the second Wi-Fi network of the access point device through scanning and the terminal device is associated with the second Wi-Fi network, where service set identifiers SSIDs of the second Wi-Fi network and the first Wi-Fi network are different. The terminal device accesses the second Wi-Fi network, and the second Wi-Fi network reuses an established protocol stack link between the terminal device and the first Wi-Fi network for communication.

20 Claims, 10 Drawing Sheets

(56)  References Cited

U.S. PATENT DOCUMENTS

2006/0256750 A1* 11/2006 Van Bemmel ........ H04W 36/18
370/331
2013/0150012 A1 6/2013 Chhabra et al.
2018/0359764 A1* 12/2018 Ong .................... H04L 12/4641
2019/0166537 A1* 5/2019 Sakai .................... H04W 36/08
2019/0182736 A1* 6/2019 Jung .................... H04W 84/12
2019/0215733 A1* 7/2019 Wang ................ H04W 36/0072
2021/0204340 A1* 7/2021 Hareuveni ............ H04W 76/15

FOREIGN PATENT DOCUMENTS

CN          111970750 A      11/2020
WO          2018113086 A1     6/2018

OTHER PUBLICATIONS

European Search Report for EP Application No. 20967350 dated
Dec. 14, 2023, 8 pages.

* cited by examiner

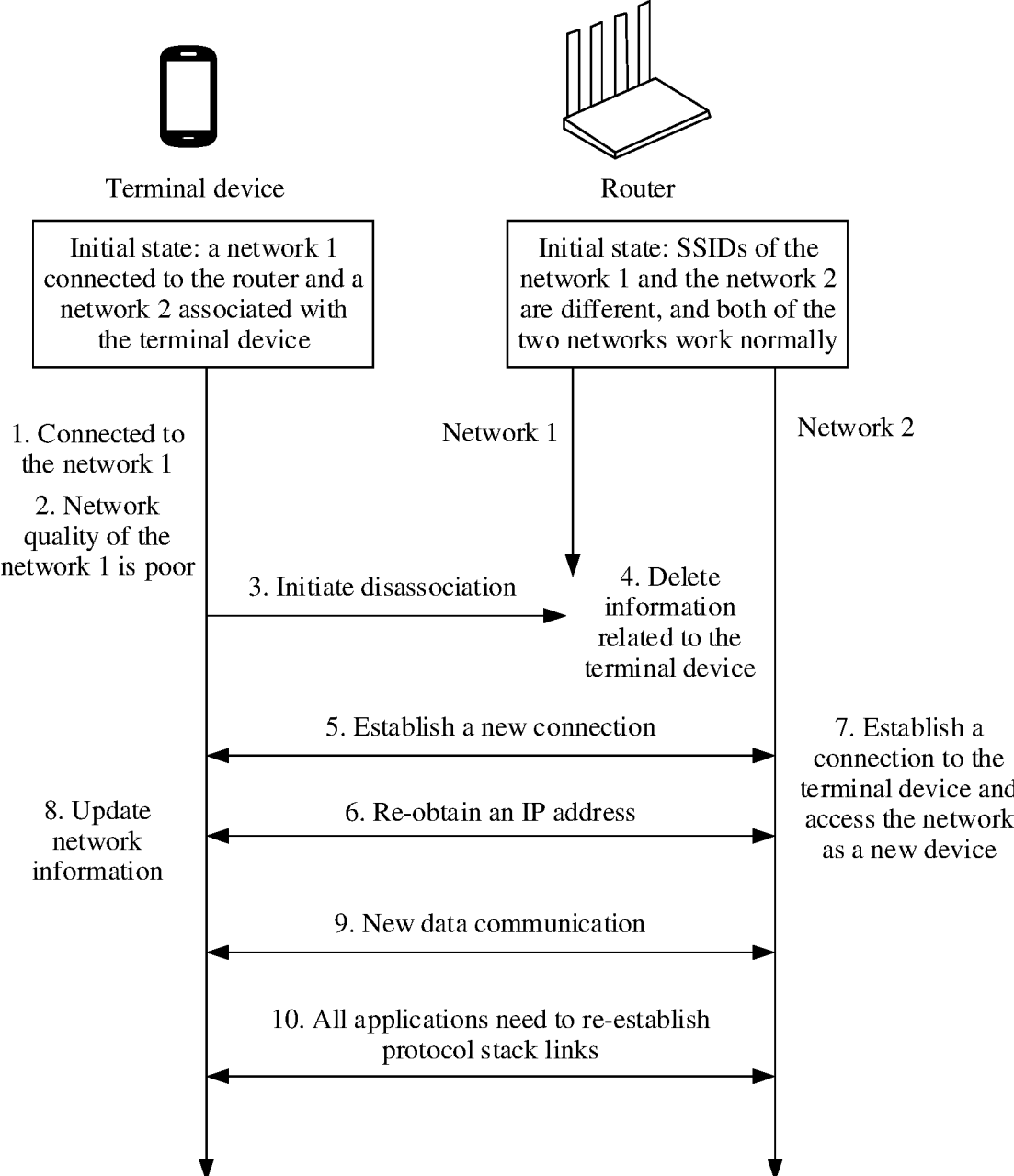

Terminal device

Router

Initial state: a network 1 connected to the router and a network 2 associated with the terminal device Initial state: SSIDs of the network 1 and the network 2 are different, and both of the two networks work normally 1. Connected to the network 1

Network 1

Network 2

2. Network quality of the network 1 is poor

3. Initiate disassociation

4. Delete information related to the terminal device

5. Establish a new connection

7. Establish a connection to the terminal device and access the network as a new device 8. Update network information 6. Re-obtain an IP address 9. New data communication 10. All applications need to re-establish protocol stack links

FIG. 2

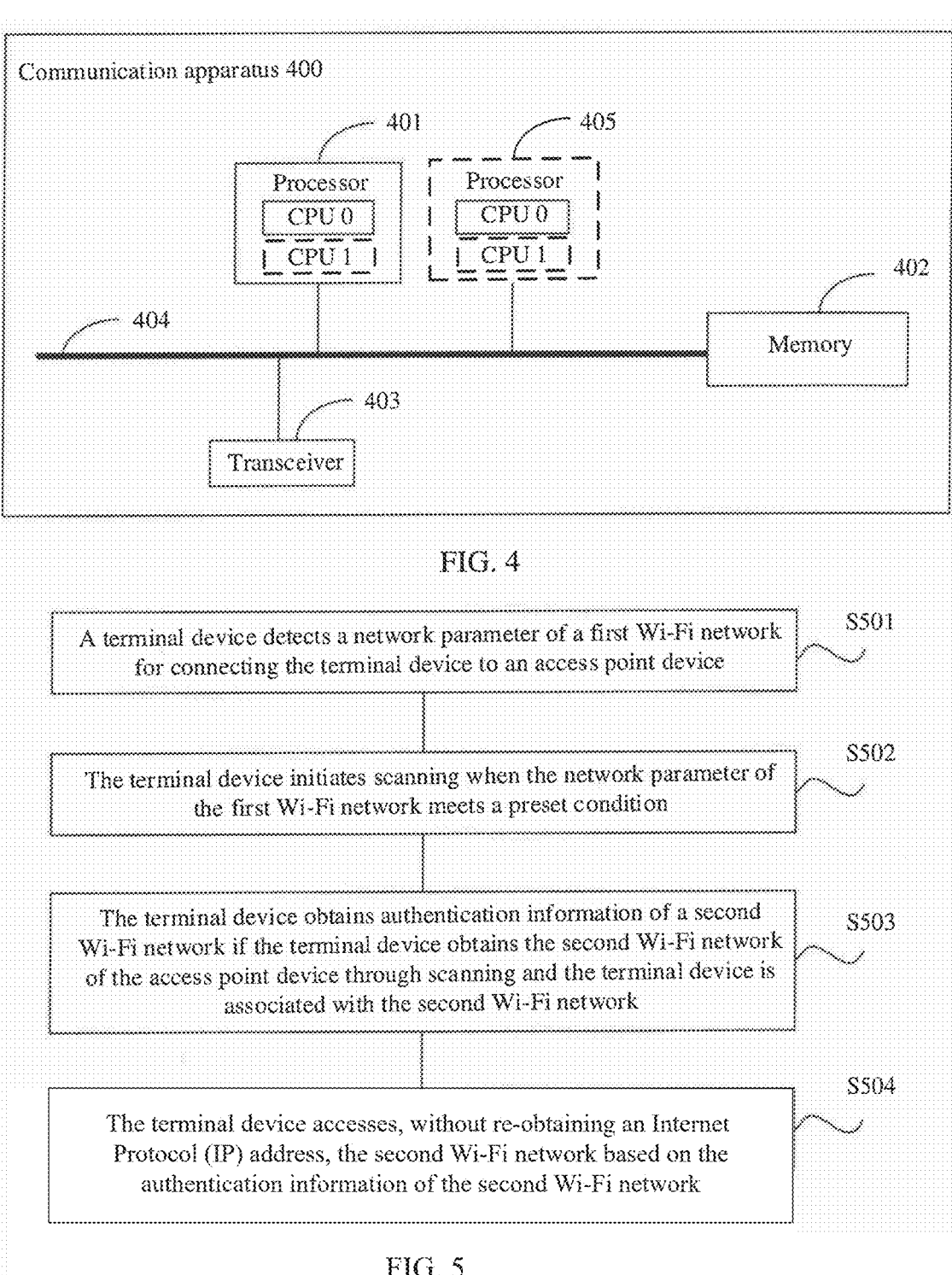

FIG. 4

A terminal device detects a network parameter of a first Wi-Fi network for connecting the terminal device to an access point device — S501

The terminal device initiates scanning when the network parameter of the first Wi-Fi network meets a preset condition — S502

The terminal device obtains authentication information of a second Wi-Fi network if the terminal device obtains the second Wi-Fi network of the access point device through scanning and the terminal device is associated with the second Wi-Fi network — S503

The terminal device accesses, without re-obtaining an Internet Protocol (IP) address, the second Wi-Fi network based on the authentication information of the second Wi-Fi network — S504

FIG. 5

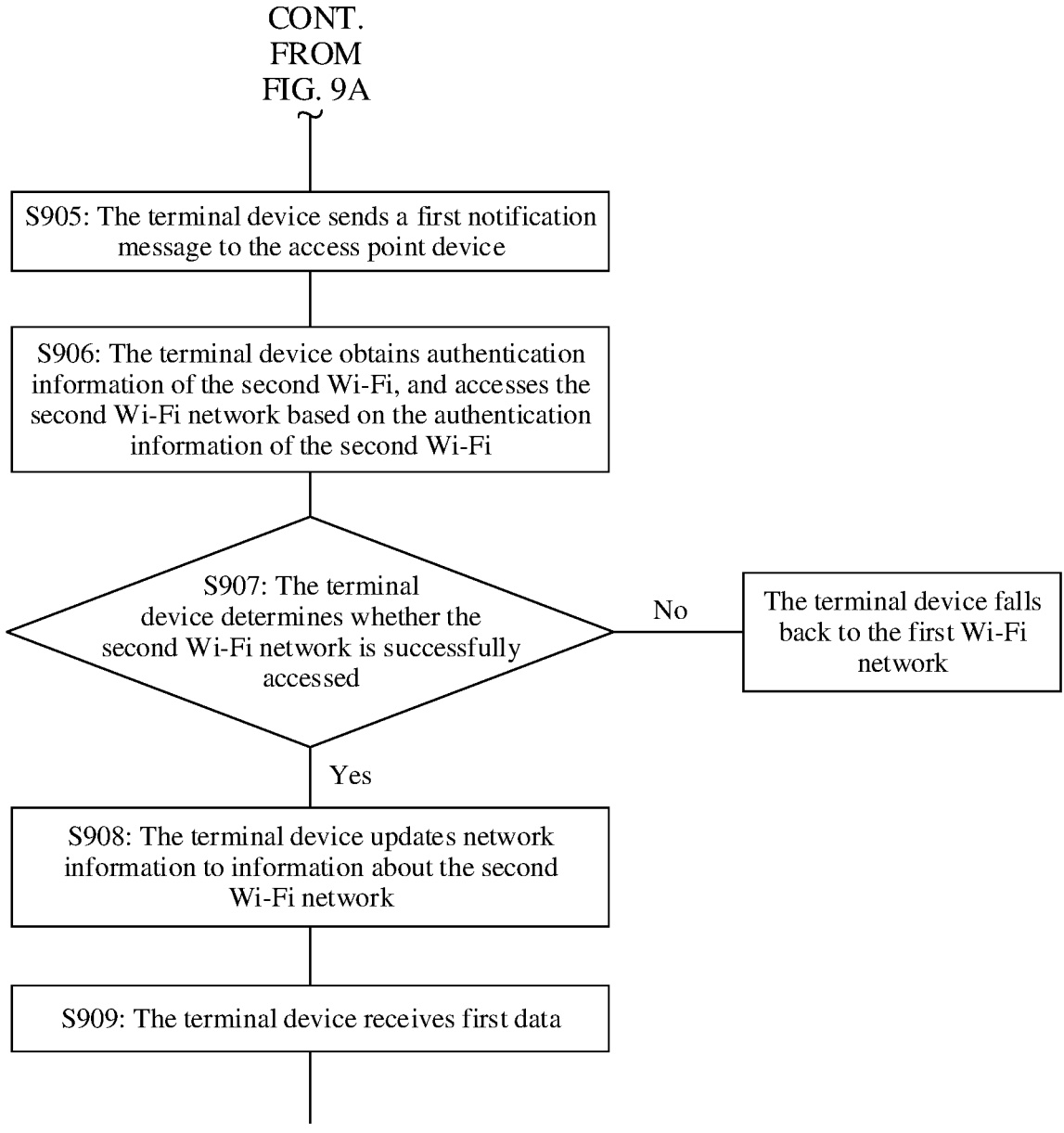

CONT.
FROM
FIG. 9A

S905: The terminal device sends a first notification message to the access point device S906: The terminal device obtains authentication information of the second Wi-Fi, and accesses the second Wi-Fi network based on the authentication information of the second Wi-Fi S907: The terminal device determines whether the second Wi-Fi network is successfully accessed No → The terminal device falls back to the first Wi-Fi network Yes S908: The terminal device updates network information to information about the second Wi-Fi network S909: The terminal device receives first data

FIG. 9B

NETWORK HANDOVER METHOD, TERMINAL DEVICE, AND ACCESS POINT DEVICE FOR PERFORMING HANDOVER BY REUSING AN ESTABLISHED PROTOCOL STACK LINK

CROSS-REFERENCE TO RELATED APPLICATIONS

This application is a continuation of International Application No. PCT/CN2020/140424, filed on Dec. 28, 2020, the disclosure of which is hereby incorporated by reference in its entirety.

TECHNICAL FIELD

Embodiments of this application relate to the field of wireless network technologies, and in particular, to a network handover method, a terminal device, and an access point device.

BACKGROUND

With development of wireless network technologies, an existing access point device may simultaneously support a plurality of frequency bands (for example, 2.4 GHz and 5 GHz frequency bands), and even a same frequency band may support a plurality of networks (for example, a home network and a guest network). For example, a router may support 2.4 GHz and 5 GHz frequency bands. During short-distance transmission, a 5 GHz network has a large bandwidth and a low delay, and provides good user experience. However, during long-distance transmission, wall penetration attenuation in the 5 GHz network is large. As a result, a signal is poor during long-distance transmission. However, the 2.4 GHz network has small wall penetration attenuation and a large coverage area. Therefore, user experience is good during long-distance transmission.

FIG. 1 is an application scenario of a dual-band router. As shown in FIG. 1, a router supports 2.4 GHz and 5 GHz frequency bands, and service set identifiers (SSID) of the two networks are different. An SSID of the 5 GHz network is xxxx 5G, and an SSID of the 2.4 GHz network is xxxx. During short-distance transmission, a terminal device is connected to the 5 GHz network. When the terminal device is farther away from the router, a signal of the 5 GHz network becomes poorer. When the signal is poor to a specific extent, an application on the terminal device displays information indicating an abnormal network connection such as "Cannot connect to a server". When a distance between the terminal device and the router is too long, the signal of the 5 GHz network is too poor. As a result, the terminal device is disconnected from the network. In this case, because the 2.4 GHz network of the router has a stronger wall penetration capability, signal strength is still strong, and the terminal device may continue to connect to the 2.4 GHz network of the router for use. However, in a process in which the terminal device is handed over from the 5 GHz network to the 2.4 GHz network, the terminal device needs to re-obtain an internet protocol (IP) address and establish a protocol stack link, to perform application-level data communication. Therefore, the terminal device is in a network disconnected state in a network handover process, resulting in poor user experience.

SUMMARY

Embodiments of this application provide a network handover method, a terminal device, and an access point device.

A network connection between the terminal and the access point device is not disconnected in a network handover process. This can improve user experience.

To achieve the foregoing objective, the following technical solutions are used in embodiments of this application.

According to a first aspect of embodiments of this application, a network handover method is provided. The method includes: A terminal device detects a network parameter of a first wireless fidelity (Wi-Fi) network for connecting the terminal device to an access point device; the terminal device initiates scanning when the network parameter of the first Wi-Fi network meets a preset condition; the terminal device obtains authentication information of a second Wi-Fi network if the terminal device obtains the second Wi-Fi network of the access point device through scanning and the terminal device is associated with the second Wi-Fi network, where service set identifiers SSIDs of the second Wi-Fi network and the first Wi-Fi network are different; the terminal device accesses the second Wi-Fi network based on the authentication information of the second Wi-Fi network; and the second Wi-Fi network reuses an established protocol stack link between the terminal device and the first Wi-Fi network for communication. Based on this solution, when the terminal device is handed over from the first Wi-Fi network of the access point device to the second Wi-Fi network of the access point device, the terminal device does not send a disassociation request to the access point device. When communicating with the second Wi-Fi network, the terminal device reuses the established protocol stack link between the terminal device and the first Wi-Fi network. Therefore, in a network handover process, the terminal device does not need to re-obtain an IP address, a network connection between the terminal device and the access point device is always not disconnected, and a problem such as a network disconnection of the terminal device does not occur. This can improve user experience. It may be understood that in this solution, in a process in which the terminal device is handed over between different networks of the access point device, the terminal device does not send the disassociation request to the access point device. Therefore, the network connection between the terminal device and the access point device is not disconnected. Compared with the conventional technology in which the terminal device needs to be disconnected in a network handover process, and consequently the terminal device needs to re-obtain an IP address and re-establish a protocol stack link when the terminal device is reconnected, in this solution, only a Wi-Fi channel is handed over, and the IP address does not need to be re-obtained, and the protocol stack link does not need to be re-established during network handover. This improves user experience.

With reference to the first aspect, in a possible implementation, frequency bands of the first Wi-Fi network and the second Wi-Fi network are different. Based on this solution, the terminal device may be handed over between networks of different frequency bands of the access point device. In addition, in a process of handover between the networks of different frequency bands, the network connection between the terminal device and the access point device is always not disconnected. Therefore, only a Wi-Fi channel is handed over, and the terminal device does not need to re-obtain an IP address and re-establish a protocol stack link during network handover. This can improve user experience.

With reference to the first aspect and the foregoing possible implementation, in another possible implementation, a frequency band of the first Wi-Fi network is 2.4 GHz, 5 GHz, or 6 GHz, and a frequency band of the second Wi-Fi network is 2.4 GHz, 5 GHz, or 6 GHz. Based on this solution, the terminal device may be handed over from a 2.4 GHz network of the access point device to a 5 GHz network, or may be handed over from a 5 GHz network of the access point device to a 2.4 GHz network, or may be handed over from a 2.4 GHz network of the terminal device to a 6 GHz network, or the like. When the terminal device is handed over between the foregoing networks, the connection between the terminal device and the access point device is not disconnected. Therefore, only a Wi-Fi channel needs to be handed over, and the terminal device does not need to re-obtain an IP address and re-establish a protocol stack link during network handover. This can improve user experience. A specific frequency band supported by the access point device is not limited in this solution. With development of wireless network technologies, the access point device may further support another subsequently extended frequency band. For example, the access point device supports 7 GHz or another subsequently extended frequency band.

With reference to the first aspect and the foregoing possible implementations, in another possible implementation, the first Wi-Fi network is a home network, and the second Wi-Fi network is a guest network; or the first Wi-Fi network is a guest network, and the second Wi-Fi network is a home network. Based on this solution, the terminal device may be handed over between a home network and a guest network of the access point device. In addition, in a process of handover between the home network and the guest network, the connection between the terminal device and the access point device is not disconnected. Therefore, the terminal device needs only to establish a Wi-Fi connection, and does not need to re-obtain an IP address or re-establish a protocol stack link. This can improve user experience. Optionally, frequency bands of the home network and the guest network may be the same, or may be different.

With reference to the first aspect and the foregoing possible implementations, in another possible implementation, before that the terminal device accesses the second Wi-Fi network, the method further includes: The terminal device sends a first notification message to the access point device. The first notification message indicates that the terminal device is in a low power consumption mode. Based on this solution, the terminal device sends, to the access point device, the first notification message indicating that the terminal device is in the low power consumption mode, so that the access point device can buffer data of the terminal device. This avoids a problem that the access point device actively kicks off the terminal and disconnects the terminal when the terminal device receives no data that is sent by the access point device to the terminal device for a plurality of times because the first Wi-Fi network is poor, and further ensures that the network connection between the terminal device and the access point device is not disconnected.

With reference to the first aspect and the foregoing possible implementations, in another possible implementation, the method further includes: The terminal device receives first data sent by the access point device by using the second Wi-Fi network. The first data is data buffered by the access point device by using the first Wi-Fi network. Based on this solution, after the terminal device establishes a Wi-Fi connection to the second Wi-Fi network of the access point device, the terminal device may receive the data buffered by the access point device in the first Wi-Fi network. In this way, the data of the terminal device is not lost after network handover. This ensures normal communication of the terminal device and further improves user experience.

With reference to the first aspect and the foregoing possible implementations, in another possible implementation, that the terminal device initiates scanning includes: The terminal device initiates scanning based on channel information of the second Wi-Fi network. Based on this solution, when initiating scanning, the terminal device may perform scanning based on the channel information of the second Wi-Fi network. In this way, scanning time can be reduced and user experience can be improved.

With reference to the first aspect and the foregoing possible implementations, in another possible implementation, that the network parameter of the first Wi-Fi network meets a preset condition includes: quality of the first Wi-Fi network is lower than a first preset threshold or a transmission rate of the first Wi-Fi network is lower than a second preset threshold. Based on this solution, the terminal device may initiate scanning when the quality of the first Wi-Fi network is poor or the transmission rate of the first Wi-Fi network is excessively low. Optionally, there may be one or more first preset thresholds and second preset thresholds. The first preset threshold and the second preset threshold may correspond to frequency bands of the first Wi-Fi network.

With reference to the first aspect and the foregoing possible implementations, in another possible implementation, the method further includes: The terminal device updates network information to information about the second Wi-Fi network. Based on this solution, after the terminal device establishes a Wi-Fi connection to the second Wi-Fi network of the access point device, the terminal device may update the network information about the terminal device to the information about the second Wi-Fi network. For example, after the terminal device establishes a Wi-Fi connection to the second Wi-Fi network of the access point device, the terminal device may update a network connection name in the notification interface to a name of the second Wi-Fi network.

According to a second aspect of embodiments of this application, a network handover method is provided. The method includes: A second wireless fidelity Wi-Fi network of an access point device establishes a connection to a terminal device; and the second Wi-Fi network reuses an established protocol stack link between the terminal device and a first Wi-Fi network of the access point device for communication, where service set identifiers SSIDs of the second Wi-Fi network and the first Wi-Fi network are different. Optionally, the first Wi-Fi network is a wireless network to which the terminal device connects before the terminal device is handed over to the second Wi-Fi network. Based on this solution, when the second Wi-Fi network of the access point device communicates with the terminal device, the second Wi-Fi network of the access point device and the terminal device reuse the established protocol stack link between the terminal device and the first Wi-Fi network for communication. Therefore, in a network handover process, a connection between the access point device and the terminal device is always not disconnected, and a problem such as a network disconnection of the terminal device does not occur. This can improve user experience.

With reference to the second aspect, in a possible implementation, frequency bands of the first Wi-Fi network and the second Wi-Fi network are different. Based on this solution, the terminal device may be handed over between networks of different frequency bands of the access point device. In addition, in a process of handover between the networks of different frequency bands, the network connection between the terminal device and the access point device is always not disconnected. This can improve user experience.

With reference to the second aspect and the foregoing possible implementation, in another possible implementation, a frequency band of the first Wi-Fi network is 2.4 GHz, 5 GHz, or 6 GHz, and a frequency band of the second Wi-Fi network is 2.4 GHz, 5 GHz, or 6 GHz. Based on this solution, the access point device may support networks of a plurality of frequency bands, and the terminal device may be handed over between the networks of the plurality of frequency bands supported by the access point device. In addition, when the terminal device is handed over between the networks of the access point device, the connection between the terminal device and the access point device is not disconnected. This can improve user experience. A specific frequency band supported by the access point device is not limited in this solution. With development of wireless network technologies, the access point device may support networks of a larger quantity and more frequency bands.

With reference to the second aspect and the foregoing possible implementations, in another possible implementation, the first Wi-Fi network is a home network, and the second Wi-Fi network is a guest network; or the first Wi-Fi network is a guest network, and the second Wi-Fi network is a home network. Based on this solution, the access point device may support a plurality of types of networks, and the terminal device may be handed over between a home network and a guest network of the access point device. In addition, in a process of handover between the home network and the guest network, the connection between the terminal device and the access point device is not disconnected. This can improve user experience. Optionally, frequency bands of the home network and the guest network may be the same, or may be different.

With reference to the second aspect and the foregoing possible implementations, in another possible implementation, before that a second Wi-Fi network of an access point device establishes a connection to a terminal device, the method further includes: The access point device receives a first notification message from the terminal device, where the first notification message indicates that the terminal device is in a low power consumption mode; and the access point device buffers first data of the terminal device based on the first notification message by using the first Wi-Fi network. Based on this solution, the access point device receives the first notification message indicating that the terminal device is in the low power consumption mode, and the access point device may buffer data of the terminal device, to avoid a problem that the access point device actively kicks off the terminal and disconnects the terminal when the terminal device receives no data that is sent by the access point device to the terminal device for a plurality of times because the first Wi-Fi network is poor, and to further ensure that the network connection between the terminal device and the access point device is not disconnected.

With reference to the second aspect and the foregoing possible implementations, in another possible implementation, the method further includes: The access point device migrates the first data from the first Wi-Fi network to the second Wi-Fi network; and the access point device sends the first data to the terminal device by using the second Wi-Fi network. Based on this solution, the access point device may migrate data buffered by the access point device by using an original network (e.g., the first Wi-Fi network) to a new network (e.g., the second Wi-Fi network), and send the data by using the second Wi-Fi network. In this way, the data of the terminal device is not lost after network handover of the terminal device. This ensures normal communication of the terminal device and further improves user experience.

According to a third aspect of embodiments of this application, a terminal device is provided. The terminal device includes a transceiver and a processor. The processor is configured to detect a network parameter of a first wireless fidelity Wi-Fi network for connecting the terminal device to an access point device; the processor initiates scanning when the network parameter of the first Wi-Fi network meets a preset condition; the processor obtains authentication information of a second Wi-Fi network if the processor obtains the second Wi-Fi network of the access point device through scanning and the terminal device is associated with the second Wi-Fi network, where service set identifiers SSIDs of the second Wi-Fi network and the first Wi-Fi network are different; the processor accesses the second Wi-Fi network based on the authentication information of the second Wi-Fi network by using the transceiver; and the second Wi-Fi network reuses an established protocol stack link between the terminal device and the first Wi-Fi network for communication.

With reference to the third aspect, in a possible implementation, frequency bands of the first Wi-Fi network and the second Wi-Fi network are different.

With reference to the third aspect and the foregoing possible implementation, in another possible implementation, a frequency band of the first Wi-Fi network is 2.4 GHz, 5 GHz, or 6 GHz, and a frequency band of the second Wi-Fi network is 2.4 GHz, 5 GHz, or 6 GHz.

With reference to the third aspect and the foregoing possible implementations, in another possible implementation, the first Wi-Fi network is a home network, and the second Wi-Fi network is a guest network; or the first Wi-Fi network is a guest network, and the second Wi-Fi network is a home network.

With reference to the third aspect and the foregoing possible implementations, in another possible implementation, the transceiver is further configured to send a first notification message to the access point device. The first notification message indicates that the terminal device is in a low power consumption mode.

With reference to the third aspect and the foregoing possible implementations, in another possible implementation, the transceiver is further configured to receive first data sent by the access point device by using the second Wi-Fi network. The first data is data buffered by the access point device by using the first Wi-Fi network.

With reference to the third aspect and the foregoing possible implementations, in another possible implementation, the processor is specifically configured to initiate scanning based on channel information of the second Wi-Fi network.

With reference to the third aspect and the foregoing possible implementations, in another possible implementation, that the network parameter of the first Wi-Fi network meets a preset condition includes: quality of the first Wi-Fi network is lower than a first preset threshold or a transmission rate of the first Wi-Fi network is lower than a second preset threshold.

With reference to the third aspect and the foregoing possible implementations, in another possible implementation, the processor is further configured to update network information to information about the second Wi-Fi network.

According to a fourth aspect of embodiments of this application, an access point device is provided. The access point device includes a first transceiver and a processor, and the first transceiver is a transceiver for receiving and sending information by a second wireless fidelity Wi-Fi network of the access point device; and the processor is configured to establish a connection to a terminal device by using the first transceiver; and the second Wi-Fi network reuses an established protocol stack link between the terminal device and a first Wi-Fi network of the access point device for communication, where service set identifiers SSIDs of the second Wi-Fi network and the first Wi-Fi network are different.

With reference to the fourth aspect, in a possible implementation, frequency bands of the first Wi-Fi network and the second Wi-Fi network are different.

With reference to the fourth aspect and the foregoing possible implementation, in another possible implementation, a frequency band of the first Wi-Fi network is 2.4 GHz, 5 GHz, or 6 GHz, and a frequency band of the second Wi-Fi network is 2.4 GHz, 5 GHz, or 6 GHz.

With reference to the fourth aspect and the foregoing possible implementations, in another possible implementation, the first Wi-Fi network is a home network, and the second Wi-Fi network is a guest network; or the first Wi-Fi network is a guest network, and the second Wi-Fi network is a home network.

With reference to the fourth aspect and the foregoing possible implementations, in another possible implementation, the access point device further includes a second transceiver, and the second transceiver is a transceiver for receiving and sending information by the first Wi-Fi network of the access point device; the second transceiver is configured to receive a first notification message from the terminal device, where the first notification message indicates that the terminal device is in a low power consumption mode; and the processor is further configured to buffer first data of the terminal device based on the first notification message by using the second transceiver.

With reference to the fourth aspect and the foregoing possible implementations, in another possible implementation, the processor is further configured to migrate the first data from the first Wi-Fi network to the second Wi-Fi network; and the first transceiver is further configured to send the first data to the terminal device.

For effect descriptions of the third aspect and the implementations of the third aspect, refer to corresponding effect descriptions of the first aspect. For effect descriptions of the fourth aspect and the implementations of the fourth aspect, refer to corresponding effect descriptions of the second aspect.

According to a fifth aspect of embodiments of this application, an embodiment of this application provides a computer-readable storage medium. The computer-readable storage medium stores instructions. When the instructions are run on a computer, the computer is enabled to perform the network handover method according to any one of the first aspect to the second aspect.

According to a sixth aspect of embodiments of this application, an embodiment of this application provides a computer program product including instructions. When the computer program product runs on a computer, the computer is enabled to perform the network handover method according to any one of the first aspect to the second aspect.

According to a seventh aspect of embodiments of this application, a network handover system is provided. The network handover system includes a terminal device and an access point device, the terminal device is configured to implement the network handover method according to the first aspect, and the access point device is configured to implement the network handover method according to the second aspect.

According to an eighth aspect of embodiments of this application, a chip system is provided. The chip system includes a processor and a memory. The memory stores computer program code. When the computer program code is executed by the processor, the network handover method according to any one of the foregoing aspects is implemented. The chip system may include a chip, or may include a chip and another discrete component.

According to a ninth aspect of embodiments of this application, a network handover apparatus is provided. The apparatus includes a processor and a memory. The memory stores instructions. When the instructions are executed by the processor, the network handover apparatus is enabled to implement the network handover method according to any one of the foregoing aspects.

According to a tenth aspect of embodiments of this application, a network handover apparatus is provided. The apparatus includes: a memory, configured to store a computer program; a transceiver, configured to receive or send a radio signal; and a processor, configured to execute the computer program, so that the electronic device implements the network handover method according to any one of the foregoing aspects.

BRIEF DESCRIPTION OF DRAWINGS

FIG. 2 is an example schematic flowchart of a network handover method according to an embodiment of this application;

FIG. 4 is an example schematic diagram of a structure composition of a communication apparatus according to an embodiment of this application;

FIG. 5 is an example schematic flowchart of another network handover method according to an embodiment of this application;

FIG. 9A and FIG. 9B are example schematic flowcharts of another network handover method according to an embodiment of this application;

DESCRIPTION OF EMBODIMENTS

Figure 1:
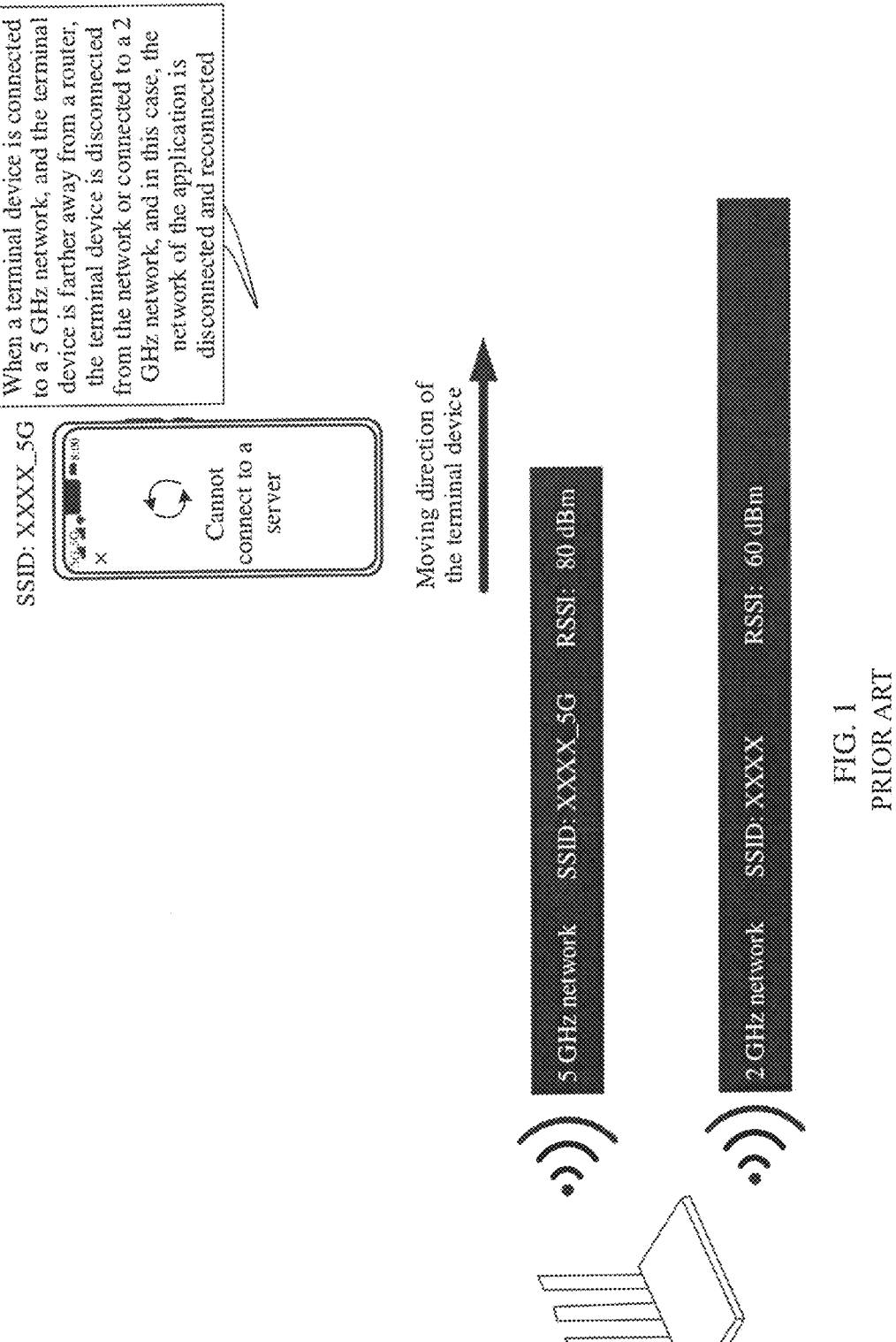
FIG. 1 is an example schematic diagram of an application scenario of a dual-band router according to an embodiment of this application.

The following describes technical solutions in embodiments of this application with reference to the accompanying drawings in embodiments of this application. In this application, "at least one" means one or more, and "a plurality of" means two or more. "And/or" describes an association relationship between associated objects, and represents that at least three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity and an execution sequence. For example, in this embodiment of this application, "first" in the first Wi-Fi network and "second" in the second Wi-Fi network are merely used to distinguish between different wireless networks. Descriptions such as "first" and "second" in embodiments of this application are merely used for indicating and distinguishing between described objects, do not show a sequence, do not indicate a specific limitation on a quantity of devices in embodiments of this application, and cannot constitute any limitation on embodiments of this application.

It should be noted that, in this application, words such as "example" or "for example" are used for representing giving an example, an illustration, or a description. Any embodiment or design scheme described as an "example" or "for example" in this application should not be explained as being more preferred or having more advantages than another embodiment or design scheme. To be precise, the word such as "example" or "for example" is intended to present a related concept in a specific manner.

An existing access point device (AP) may simultaneously support a plurality of frequency bands, and even a same frequency band may support a plurality of networks. For example, the access point device may support 2.4 GHz and 5 GHz frequency bands. For another example, the access point device may support a home network and a guest network, and frequency bands of the home network and the guest network may be the same or may be different.

For example, the access point device in this embodiment of this application may be a router, or may be any device that supports a plurality of frequency bands or a plurality of networks. A specific type of the access point device is not limited in this application. In the following embodiments, only an example in which the access point device is a router is used for description.

For example, frequency bands supported by the router are 2.4 GHz and 5 GHz, and a plurality of mobile terminal devices (for example, a computer, a mobile phone, and a tablet) may be connected to a network of the router. Due to differences in frequency bands, bandwidths, interference, wall penetration performance, and the like of different networks, user experience of a terminal device may be different when the terminal device is connected to different networks. For example, when the terminal device is close to the router, the 5 GHz network has a large bandwidth and a low delay, and provides good user experience. However, when the terminal device is far away from the router, wall penetration attenuation in the 5 GHz network is large. As a result, a signal is poor during long-distance transmission. However, the 2.4 GHz network has small wall penetration attenuation and a large coverage area. Therefore, user experience is good during long-distance transmission. Therefore, when the terminal device moves, user experience may be poor due to a reason such as a poor signal of a currently connected network.

If the router supports multi-band combination (for example, SSIDs, passwords, authentication modes, and the like of a plurality of networks of the router are the same), the terminal device may be handed over to a network with better experience in an 11 kvr or private roaming manner. For example, in a scenario in which SSIDs of the 2.4 GHz network and the 5 GHz network of the router are the same (the router supports dual-band combination), if the terminal device is far away from the router, and a signal of the 5 GHz network is poor, the terminal device may be handed over to the 2.4 GHz network in a roaming manner.

However, if the router does not support the multi-band combination mode, or if the router supports multi-band combination mode but the multi-band combination mode is not configured, the terminal device may be disconnected from the network when a network signal is poor, or may be disconnected from a network with a poor signal and then connected to a wireless network with a better signal. For example, the router supports a plurality of wireless networks, and SSIDs of the plurality of wireless networks are different. In this case, when a signal of a currently connected network is poor, the terminal device may be disconnected from the network, or may be disconnected from the current network and then connected to another network of the router.

For example, in an application scenario of a dual-band router shown in FIG. 1, frequency bands supported by the dual-band router are 2.4 GHz and 5 GHz, and SSIDs of the 2.4 GHz network and the 5 GHz network are different. An SSID of the 5 GHz network is xxxx 5G, and an SSID of the 2.4 GHz network is xxxx. During short-distance transmission, the 5 GHz network has a large bandwidth and a low delay, and provides good user experience. A terminal device is connected to the 5 GHz network. When the terminal device is farther away from the router, a signal of the 5 GHz network becomes poorer because wall penetration attenuation in the 5 GHz network is large. When the signal is poor to a specific extent, an application on the terminal device displays information indicating an abnormal network connection such as "Cannot connect to a server". As shown in FIG. 1, when a distance between the terminal device and the router is long, received signal strength indication (RSSI) (for example, −80 dBm) of the 5 GHz network is less than RSSI (for example, −60 dBm) of the 2.4 GHz network, and the signal of the 5 GHz network is poor. As a result, the terminal device is disconnected from the network. In this case, because the 2.4 GHz network of the router has a stronger wall penetration capability, signal strength is still strong, and the terminal device may continue to connect to the 2.4 GHz network of the router for use. However, in a process in which the terminal device is handed over from the 5 GHz network to the 2.4 GHz network, the terminal device needs to re-obtain an IP address and establish a protocol stack link, to perform application-level data communication. Therefore, the terminal device is in a network disconnected state in a network handover process, resulting in poor user experience.

FIG. 2 shows a network handover method. As shown in FIG. 2, a router supports a network 1 (for example, a 5 GHz network) and a network 2 (for example, a 2.4 GHz network), and SSIDs of the network 1 and the network 2 are different. A terminal device is currently connected to the network 1, and the terminal device has been associated with the network 2 (the terminal device stores a user name and a password of the network 2). When network quality of the network 1 is poor, a user triggers handover, or the terminal device cannot maintain a connection with network 1, the terminal device sends a disassociation frame to the network 1 of the router, to notify the router of disconnection. After receiving the disassociation frame from the terminal device, the router deletes information related to the terminal device, for example, data information. After disconnecting from the network 1, the terminal device scans a signal of the network 2, and establishes a new connection to the network 2. The terminal device re-obtains an IP address on the network 2 and accesses the network 2. The terminal device updates network information. At the same time, the router updates information about the terminal device and determines that a new device accesses the network. However, in this method, after the terminal device sends the disassociation frame, the terminal device is disconnected from the network 1. After the disconnection, an application of the terminal device may display prompt information such as "cannot connect to a server". After establishing a wireless fidelity (Wi-Fi) connection to the network 2, the terminal device needs to re-obtain an IP address and re-establish a protocol stack link, to perform application-level data communication.

Figure 3:
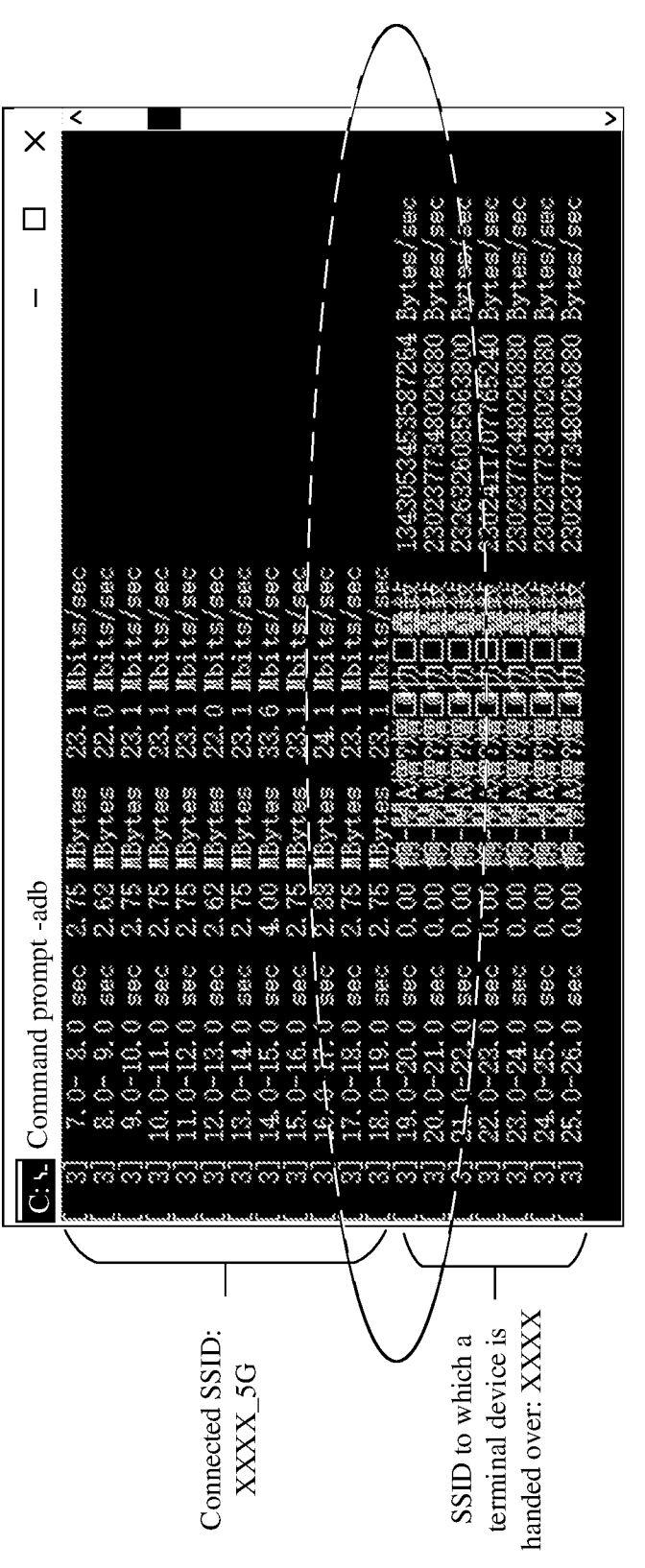
FIG. 3 is an example schematic diagram of a simulation result of a network handover method according to an embodiment of this application.

As shown in FIG. 3, it can be learned from a test result of a network performance test tool iperf that, before the terminal device is disconnected from a 5 GHz network, an average throughput of the network is 30 Mbits/sec. In a network handover process, the terminal device is disconnected from the 5 GHz network. After the network is disconnected, the iperf tool is also disconnected. A Wi-Fi connection needs to be re-established for normal communication. That is, in the method, in a process of handover from the 5 GHz network to the 2.4 GHz network, the terminal device needs to be disconnected, and the terminal device needs to re-obtain an IP address and re-establish a protocol stack link when the terminal device is reconnected. This affects user experience.

To improve a problem in the conventional technology that user experience is affected because the terminal device needs to be disconnected in a network handover process and the terminal device needs to re-obtain an IP address and re-establish a protocol stack link when the terminal device is reconnected, an embodiment of this application provides a network handover method. In the method, an IP address does not need to be re-obtained in a network handover process. This can improve user experience.

For example, in the network handover method provided in this embodiment of this application, the terminal device may be a web-connected terminal device, such as a tablet computer, a desktop computer, a laptop computer, a notebook computer, an ultra-mobile personal computer (UMPC), a handheld computer, a netbook, a personal digital assistant (PDA), or a mobile phone. The access point device in this embodiment of this application may be a device that supports a plurality of frequency bands or a plurality of networks, such as a router. Specific forms of the terminal device and the access point device are not specifically limited in embodiments of this application, and are merely examples for description herein.

During specific implementation, the terminal device and the access point device each may use a composition structure shown in FIG. 4, or include components shown in FIG. 4.

For example, FIG. 4 is a schematic diagram of composition of a communication apparatus 400 according to an embodiment of this application. As shown in FIG. 4, the communication apparatus 400 may include at least one processor 401, a memory 402, a transceiver 403, and a communication bus 404.

The following specifically describes the components of the communication apparatus 400 with reference to FIG. 4.

The processor 401 is a control center of the communication apparatus 400, and may be one processor or may be a collective term of a plurality of processing elements. For example, the processor 401 is a central processing unit (CPU), an application-specific integrated circuit (ASIC), or one or more integrated circuits configured to implement this embodiment of this application, for example, one or more microprocessors (e.g., digital processor signal, DSP), or one or more field programmable gate arrays (FPGA).

The processor 401 may execute various functions of the communication device by running or executing a software program stored in the memory 402 and invoking data stored in the memory 402.

During specific implementation, in an embodiment, the processor 401 may include one or more CPUs, for example, a CPU 0 and a CPU 1 shown in FIG. 4.

During specific implementation, in an embodiment, the communication apparatus 400 may include a plurality of processors, for example, the processor 401 and a processor 405 shown in FIG. 4. Each of the processors may be a single-core processor (e.g., single-CPU) or a multi-core processor (e.g., multi-CPU). The processor herein may be one or more communication devices, circuits, and/or processing cores configured to process data (for example, computer program instructions).

The memory 402 may be a read-only memory (ROM) or another type of static storage communication device that can store static information and instructions; or a random access memory (RAM) or another type of dynamic storage communication device that can store information and instructions. The memory 402 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of instructions or a data structure and that is accessible by a computer, but is not limited thereto. The memory 402 may exist independently, and is connected to the processor 401 through the communication bus 404. The memory 402 may alternatively be integrated with the processor 401. The memory 402 is configured to store a software program for executing the solutions of this application, and the processor 401 controls execution of the software program.

The transceiver 403 is configured to communicate with another device (for example, an access point or a station). Certainly, the transceiver 403 may be further configured to communicate with a communication network. The communication network is, for example, the Ethernet, a radio access network (RAN), or a wireless local area network (WLAN). The transceiver 403 may include a receiving unit for implementing a receiving function and a sending unit for implementing a sending function.

The communication bus 404 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of indication, the bus is indicated by using only one thick line in FIG. 4. However, this does not indicate that there is only one bus or only one type of bus.

Optionally, the terminal device and the access point device may include more or fewer components than those shown in FIG. 4. FIG. 4 is merely an example.

With reference to FIG. 4, FIG. 5 shows a network handover method according to an embodiment of this application. The method may include the following steps.

S501: A terminal device detects a network parameter of a first Wi-Fi network for connecting the terminal device to an access point device.

Optionally, the access point device may support wireless networks of a plurality of frequency bands or a plurality of different types of wireless networks. The first Wi-Fi network may be a wireless network of any frequency band or type supported by the access point device. For example, when the access point device supports a 2.4 GHz network and a 5 GHz network, the first Wi-Fi network may be a 2.4 GHz network, or may be a 5 GHz network.

Optionally, the network parameter of the first Wi-Fi network may include parameters such as quality of the first Wi-Fi network and a transmission rate of the first Wi-Fi network. Specific content of the network parameter of the first Wi-Fi network is not limited in this embodiment of this application, and is merely an example for description herein.

S502: The terminal device initiates scanning when the network parameter of the first Wi-Fi network meets a preset condition.

For example, that the network parameter of the first Wi-Fi network connected to the terminal device meets the preset condition includes: quality of the first Wi-Fi network connected to the terminal device is lower than a first preset threshold or a transmission rate of the first Wi-Fi network connected to the terminal device is lower than a second preset threshold.

For example, if the terminal device is connected to the 5 GHz network, when network quality of the 5 GHz network connected to the terminal device is poor, the terminal device may actively initiate scanning. For another example, if the terminal device is connected to the 2.4 GHz network, when a transmission rate of the 2.4 GHz network connected to the terminal device is excessively low, the terminal device may also actively initiate scanning. A specific preset condition for initiating scanning by the terminal is not limited in this embodiment of this application, and is merely an example for description herein.

Optionally, there may be one or more first preset thresholds. The first preset threshold may correspond to a frequency band or a network type of the first Wi-Fi network. For example, a corresponding first preset threshold when the first Wi-Fi network connected to the terminal device is a 2.4 GHz network may be different from a corresponding first preset threshold when the first Wi-Fi network is a 5 GHz network. There may be one or more second preset thresholds. The second preset threshold may correspond to a frequency band or a network type of the first Wi-Fi network. For another example, a corresponding second preset threshold when the first Wi-Fi network connected to the terminal device is a home network may alternatively be different from a corresponding second preset threshold when the first Wi-Fi network is a guest network.

Optionally, when a user learns impact of factors such as frequency bands, bandwidths, interference, and wall penetration performance of different networks on a network speed, when the terminal device is far away from the router, the user may also actively trigger the terminal device to initiate scanning. For example, when the terminal device is connected to the 5 GHz network and has been associated with the 2.4 GHz network, and the terminal device is far away from the router, if the user actively taps the 2.4 GHz network to hand over the network from the 5 GHz network to the 2.4 GHz network, the terminal device may actively initiate scanning in response to an action of triggering the network handover by the user.

For example, when initiating scanning, the terminal may scan all connectable wireless networks, or may scan only another network of the access point device.

Optionally, that the network supported by the access point device includes the first Wi-Fi network and a second Wi-Fi network is used as an example. That the terminal device initiates scanning may include: The terminal device initiates scanning based on channel information of the second Wi-Fi network. In this implementation, the terminal device may scan only a channel of the second Wi-Fi network to determine whether the second Wi-Fi network exists. It should be noted that the terminal device has been associated with the second Wi-Fi network, and the terminal device may scan the second Wi-Fi network based on the channel information of the second Wi-Fi network stored in the terminal device. For example, if the channel information of the second Wi-Fi network stored in the terminal device is a channel 6, the terminal device may scan only the channel 6 when initiating scanning, to determine whether there is a network on the channel 6. In this way, scanning time can be reduced and user experience can be improved.

It may be understood that in this embodiment of this application, when quality of the first Wi-Fi network connected to the terminal device is poor or a transmission rate is low, scanning may be actively initiated to determine whether there is another connectable wireless network.

S503: The terminal device obtains authentication information of the second Wi-Fi network if the terminal device obtains the second Wi-Fi network of the access point device through scanning and the terminal device is associated with the second Wi-Fi network.

Service set identifiers (SSIDs) of the second Wi-Fi network and the first Wi-Fi network are different.

Optionally, the second Wi-Fi network obtained through scanning by the terminal device and the first Wi-Fi network currently connected to the terminal device are two Wi-Fi networks of a same access point device, and SSIDs of the two Wi-Fi networks are different. For example, the access point device is a multi-band router. The multi-band router supports the first Wi-Fi network and the second Wi-Fi network, and network names of the first Wi-Fi network and the second Wi-Fi network are different.

Optionally, that the terminal device is associated with the second Wi-Fi network includes: The terminal device stores information such as a network name, a password, and a channel of the second Wi-Fi network. Because the terminal device is associated with the second Wi-Fi network, the terminal device may access the second Wi-Fi network based on the authentication information of the second Wi-Fi network when obtaining the second Wi-Fi network through scanning.

For example, the authentication information of the second Wi-Fi network includes authentication information such as a network name and a password of the second Wi-Fi network. Specific content of the authentication information of the second Wi-Fi network is not limited in this embodiment of this application, and is merely an example for description herein. It may be understood that the authentication information of the second Wi-Fi network may include information required when the terminal device accesses the second Wi-Fi network.

Optionally, the access point device may be a multi-band router, and the multi-band router may support one or more networks in a same frequency band. For example, the first Wi-Fi network and the second Wi-Fi network may be networks of different frequency bands in the multi-band router, or may be different types of networks of a same frequency band in the multi-band router.

For example, a frequency band of the first Wi-Fi network may be 2.4 GHz, 5 GHz, or 6 GHz, and a frequency band of the second Wi-Fi network may be 2.4 GHz, 5 GHz, or 6 GHz.

For example, the first Wi-Fi network and the second Wi-Fi network may be networks of different frequency bands. For example, the access point device is a dual-band router, and the dual-band router supports 2.4 GHz and 5 GHz frequency bands. A frequency band of the first Wi-Fi network may be 2.4 GHz, and a frequency band of the second Wi-Fi network may be 5 GHz. Alternatively, a frequency band of the first Wi-Fi network may be 5 GHz, and a frequency band of the second Wi-Fi network may be 2.4 GHz. In this embodiment of this application, a quantity of frequency bands and a frequency band type supported by the access point device are not limited. With development of wireless network technologies, the access point device may further support another subsequently extended frequency band. For example, the access point device supports 7 GHz or another subsequently extended frequency band, and all frequency band types supported by the access point device can fall within the protection scope of this application. Herein, only an example in which the access point device supports 2.4 GHz and 5 GHz frequency bands is provided for description.

For another example, the first Wi-Fi network and the second Wi-Fi network may be different types of networks. The first Wi-Fi network may be a home network, and the second Wi-Fi network may be a guest network. Alternatively, the first Wi-Fi network may be a guest network, and the second Wi-Fi network may be a home network. Optionally, frequency bands of the home network and the guest network may be the same or may be different. This is not limited in this application.

Optionally, a difference between a medium access control (MAC) address of the second Wi-Fi network obtained through scanning by the terminal device and a MAC address of the first Wi-Fi network is small. For example, the MAC address of the second Wi-Fi network and the MAC address of the first Wi-Fi network have five same bytes. Optionally, signal strength of the second Wi-Fi network that is obtained through scanning by the terminal device is close to signal strength of the first Wi-Fi network. For example, a difference between signal strength of the second Wi-Fi network and signal strength of the first Wi-Fi network is within 20 dbm.

Optionally, quality of the second Wi-Fi network obtained through scanning in step S503 may be better than the quality of the first Wi-Fi network, or signal strength of the second Wi-Fi network may be higher than the signal strength of the first Wi-Fi network, or a transmission rate of the second Wi-Fi network may be higher than the transmission rate of the first Wi-Fi network.

Optionally, if the terminal device obtains the second Wi-Fi network of the access point device through scanning, but the terminal device is not associated with the second Wi-Fi network (for example, the terminal device does not store password information of the second Wi-Fi network), the terminal device continues to maintain a connection to the first Wi-Fi network, and does not trigger handover to the second Wi-Fi network. For example, if the terminal device obtains the second Wi-Fi network through scanning, but the terminal device is not connected to the second Wi-Fi network, and the terminal device does not store the second Wi-Fi network, the terminal device does not trigger a network handover, and still maintains the connection to the first Wi-Fi network even if the terminal device obtains the second Wi-Fi network through scanning.

Optionally, after the terminal device initiates scanning, if the terminal device does not obtain the second Wi-Fi network of the access point device through scanning, but obtains a third Wi-Fi network through scanning, and the third Wi-Fi network and the first Wi-Fi network are wireless networks of different access point devices, the terminal device maintains the connection to the first Wi-Fi network, and does not trigger network handover.

S504: The terminal device accesses the second Wi-Fi network based on the authentication information of the second Wi-Fi network.

The second Wi-Fi network reuses an established protocol stack link between the terminal device and the first Wi-Fi network for communication.

For example, the terminal device may access the second Wi-Fi network based on the password information of the second Wi-Fi network. Optionally, that the terminal device accesses the second Wi-Fi network may include a Wi-Fi connection establishment procedure such as authentication, association, and key exchange between the terminal device and the second Wi-Fi network. A specific procedure and steps of establishing a Wi-Fi connection are not described in detail in this embodiment of this application. For details, refer to related content in the conventional technology.

Optionally, when accessing the second Wi-Fi network, the terminal device may access the second Wi-Fi network in a reassociation manner, or may access the second Wi-Fi network in an association manner. For example, when accessing the second Wi-Fi network, the terminal device may send a reassociation frame or an association frame to the access point device, to request to establish a Wi-Fi connection to the second Wi-Fi network. A specific manner in which the terminal device accesses the second Wi-Fi network is not limited in this application, and is merely an example for description herein.

Before the terminal device accesses the second Wi-Fi network of the access point device, the terminal device does not send a disassociation request to the access point device. Therefore, the connection between the terminal device and the first Wi-Fi network of the access point device is not disconnected. Therefore, when the terminal device accesses the second Wi-Fi network, the terminal device does not need to re-obtain an IP address, and the second Wi-Fi network may reuse the established protocol stack link between the terminal device and the first Wi-Fi network for communication. That is, when accessing the second Wi-Fi network, the terminal device needs only to perform frame interaction in a Wi-Fi network access procedure, and does not need to re-obtain an IP address. When communicating with the second Wi-Fi network, the terminal device reuses the established protocol stack link between the terminal device and the first Wi-Fi network. Therefore, in a network handover process, a network between the terminal device and the access point device is always not disconnected.

It may be understood that, when the quality of the first Wi-Fi network of the access point device connected to the terminal device is poor, because in this embodiment of this application, the terminal device does not send a disassociation frame to the access point device to request to disconnect from the network, and the network connection between the terminal device and the access point device is always not disconnected, the terminal device does not need to re-obtain an IP address. Therefore, after the terminal device accesses the second Wi-Fi network of the access point device, the terminal device may communicate with the second Wi-Fi network on the established protocol stack link between the terminal device and the first Wi-Fi network.

For example, the access point device is a dual-band router, the dual-band router supports a 2.4 GHz network and a 5 GHz network, the first Wi-Fi network is the 5 GHz network, and the second Wi-Fi network is the 2.4 GHz network. When establishing a Wi-Fi connection to the 2.4 GHz network, the terminal device needs only to perform frame interaction in a Wi-Fi network access procedure, and does not need to re-obtain an IP address. In addition, when the terminal device communicates by using the 2.4 GHz network, the protocol stack link established when the terminal device communicates with the 5 GHz network may be reused. To be specific, in a process in which the network of the terminal device is handed over from the 5 GHz network of the dual-band router to the 2.4 GHz network of the dual-band router, only a Wi-Fi connection needs to be re-established, an IP address does not need to be re-obtained, and a protocol stack link does not need to be re-established. Communication may continue on an original protocol stack link.

It may be understood that, because the terminal device may be connected to a wireless network, and a connection between the terminal device and the second Wi-Fi network is established, the connection between the terminal device and the first Wi-Fi network is disconnected. In addition, in a process in which the wireless network connected to the terminal device is handed over from the first Wi-Fi network of the access point device to the second Wi-Fi network of the access point device, the network connection between the terminal device and the access point device is always not disconnected, and only a Wi-Fi channel is handed over. Therefore, for the access point device, when the terminal device establishes a Wi-Fi connection to the second Wi-Fi network, the terminal device is still used as an old device for access, and related information of the terminal device is still retained.

Figure 6:
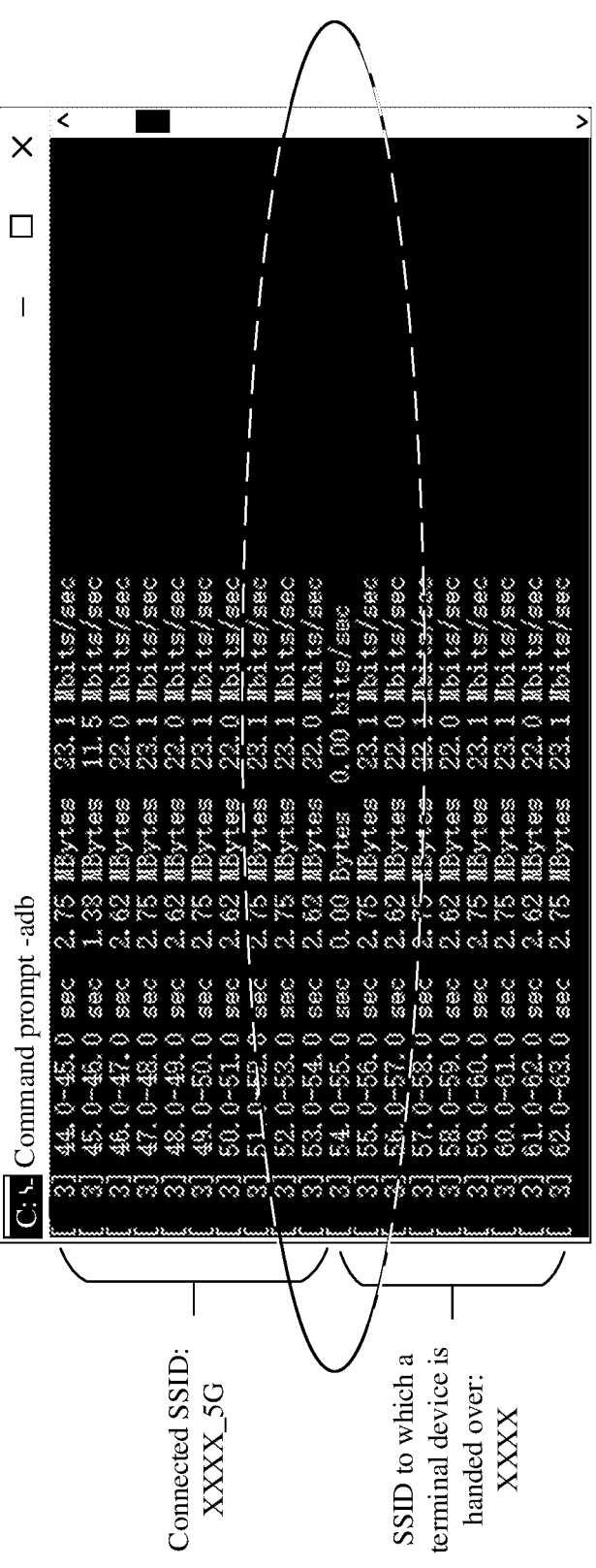
FIG. 6 is an example schematic diagram of a simulation result of another network handover method according to an embodiment of this application.

For example, the access point device is a dual-band router, the dual-band router supports a 5 GHz network and a 2.4 GHz network, the first Wi-Fi network is the 5 GHz network, an SSID of the 5 GHz network is XXXX 5G, the second Wi-Fi network is the 2.4 GHz network, and an SSID of the 2.4 GHz network is XXXX. As shown in FIG. 6, it can be learned from a test result of a network performance test tool iperf that, in a process in which the terminal device is handed over from the 5 GHz network of the dual-band router to the 2.4 GHz network of the dual-band router, the test tool iperf can still maintain normal communication before and after the network handover, and has specific throughput data, and a network disconnection of the terminal device does not occur.

According to the network handover method provided in this embodiment of this application, when the network parameter of the first Wi-Fi network of the access point device connected to the terminal device meets the preset condition, the terminal initiates scanning. In addition, when the terminal obtains the second Wi-Fi network of the access point device through scanning, and the terminal device is associated with the second Wi-Fi network, the terminal device obtains the authentication information of the second Wi-Fi network, and accesses the second Wi-Fi network. Therefore, in this solution, when the quality of the first Wi-Fi network of the access point device connected to the terminal device is poor, because the terminal device does not send a disassociation frame to the access point device to request to disconnect from the network, the network connection between the terminal device and the access point device is always not disconnected. Therefore, when accessing the second Wi-Fi network, the terminal device does not need to re-obtain an IP address, and the terminal device may communicate with the second Wi-Fi network on the established protocol stack link between the terminal device and the first Wi-Fi network. It may be understood that, compared with the conventional technology in which the terminal device needs to be disconnected in a network handover process, and consequently, the terminal device needs to re-obtain an IP address and re-establish a protocol stack link when the terminal device is reconnected, a network disconnection of the terminal device does not occur, and the terminal device does not need to re-obtain an IP address in the solution in this embodiment of this application. This can improve user experience.

Figure 7:
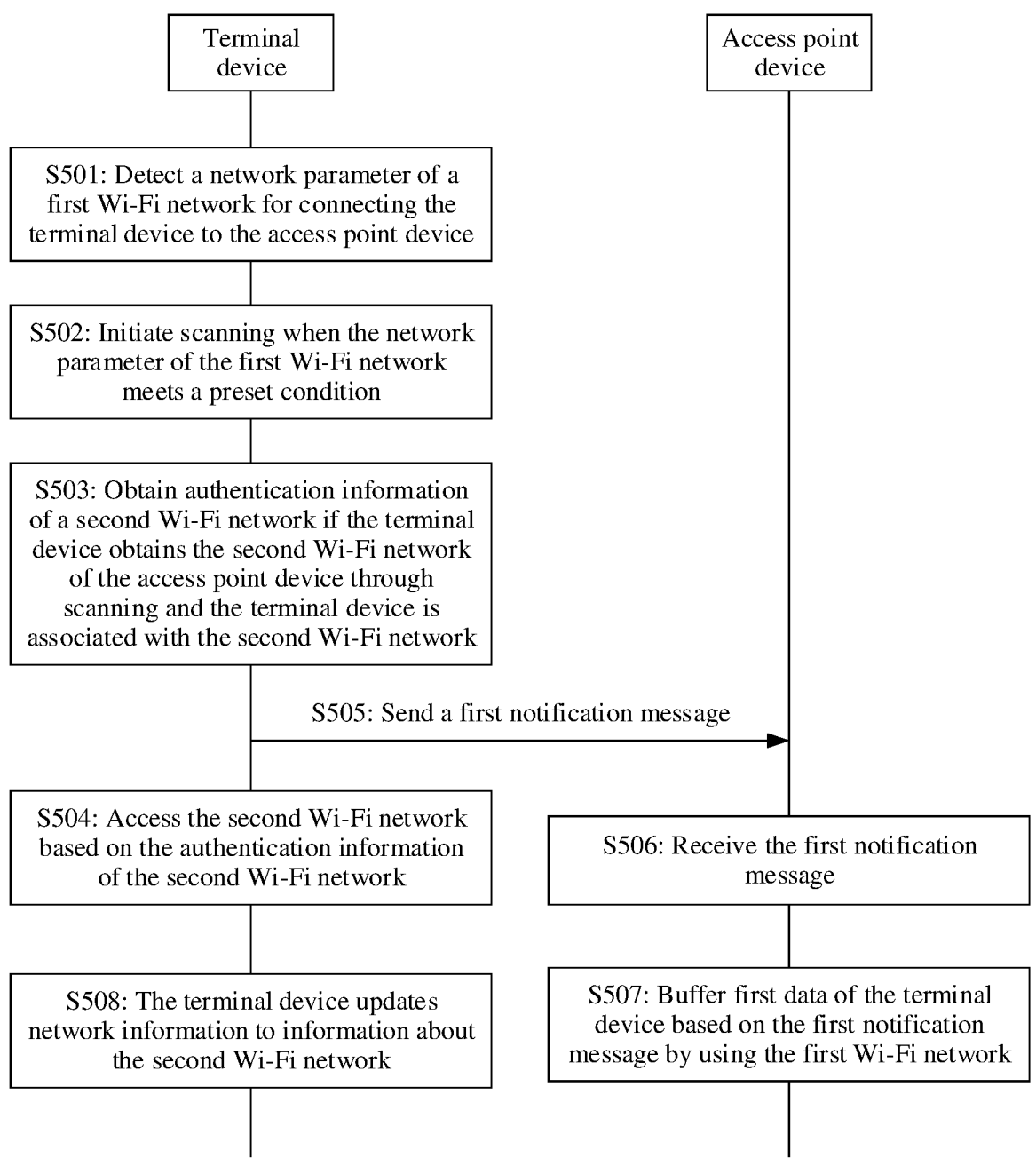
FIG. 7 is an example schematic flowchart of another network handover method according to an embodiment of this application.

Optionally, as shown in FIG. 7, after the terminal device obtains the second Wi-Fi network of the access point device through scanning, the method may further include steps S505 to S508.

S505: The terminal device sends a first notification message to the access point device.

The first notification message indicates that the terminal device is in a low power consumption mode. For example, the first notification message indicates that the terminal device is in a sleep state.

Optionally, when the terminal device obtains the second Wi-Fi network of the access point device through scanning, the terminal device may send, to the access point device, the first notification message indicating that the terminal device is in the low power consumption mode, so that the access point device buffers data of the terminal device by using the first Wi-Fi network.

It may be understood that the terminal device sends, to the access point device, the first notification message indicating that the terminal device is in the low power consumption mode, so that the access point device can buffer the data of the terminal device. This avoids a problem that the access point device actively kicks off the terminal and disconnects the terminal when the terminal device receives no data that is sent by the access point device to the terminal device for a plurality of times because the first Wi-Fi network is poor, and further ensures that the network connection between the terminal device and the access point device is not disconnected.

S506: The access point device receives the first notification message.

For example, the access point device receives the first notification message indicating that the terminal device is in the low power consumption mode.

S507: The access point device buffers first data of the terminal device based on the first notification message by using the first Wi-Fi network.

For example, after learning, based on the first notification message, that the terminal device is in the low power consumption mode, the access point device buffers the data of the terminal device by using the first Wi-Fi network connected to the terminal device.

For example, the access point device is a dual-band router, the dual-band router supports a 2.4 GHz network and a 5 GHz network, the first Wi-Fi network is the 5 GHz network, and the second Wi-Fi network is the 2.4 GHz network. When quality of the 5 GHz network is poor, the terminal device sends the first notification message to the dual-band router after obtaining the 2.4 GHz network through scanning. After learning that the terminal device is in the low power consumption mode, the dual-band router may buffer data of the terminal device by using the 5 GHz network.

S508: The terminal device updates network information to information about the second Wi-Fi network.

For example, after the terminal device accesses the second Wi-Fi network, a network currently connected to the terminal device is the second Wi-Fi network, and the terminal device may update the network information to the information about the second Wi-Fi network. For example, the terminal device updates a network connection name in the notification interface to a name of the second Wi-Fi network.

For example, the access point device is a dual-band router, the dual-band router supports a 5 GHz network and a 2.4 GHz network, the first Wi-Fi network is the 5 GHz network, an SSID of the 5 GHz network is XXXX 5G, the second Wi-Fi network is the 2.4 GHz network, and an SSID of the 2.4 GHz network is XXXX. After the terminal device is handed over from the 5 GHz network of the dual-band router to the 2.4 GHz network of the dual-band router, the terminal device updates the network name of the wireless local area network to the SSID of the 2.4 GHz network (for example, XXXX).

Optionally, when the terminal device successfully accesses the second Wi-Fi network, the terminal device updates the network information to the information about the second Wi-Fi network. When the terminal device does not successfully access the second Wi-Fi network, the terminal device falls back to the first Wi-Fi network, and accesses the first Wi-Fi network.

It may be understood that a specific sequence of performing steps S501 to S508 is not limited in this embodiment of this application. FIG. 7 is merely an example for description. Optionally, after obtaining the second Wi-Fi network of the access point device through scanning, the terminal device may first send the first notification message to the access point device, and then access the second Wi-Fi network.

According to the network handover method provided in this embodiment of this application, when the terminal device is handed over from the first Wi-Fi network of the access point device to the second Wi-Fi network of the access point device, the terminal device does not send a disassociation request to the access point device. Therefore, in a network handover process, the terminal device does not need to re-obtain an IP address, the network connection between the terminal device and the access point device is always not disconnected, and a problem such as a network disconnection of the terminal device does not occur. This can improve user experience. In addition, the terminal device sends, to the access point device, the first notification message indicating that the terminal device is in the low power consumption mode, so that the access point device can buffer the data of the terminal device. This avoids a problem that the access point device actively kicks off the terminal and disconnects the terminal when the terminal device receives no data that is sent by the access point device to the terminal device for a plurality of times because the first Wi-Fi network is poor, and further ensures that the network connection between the terminal device and the access point device is not disconnected.

Figure 8:
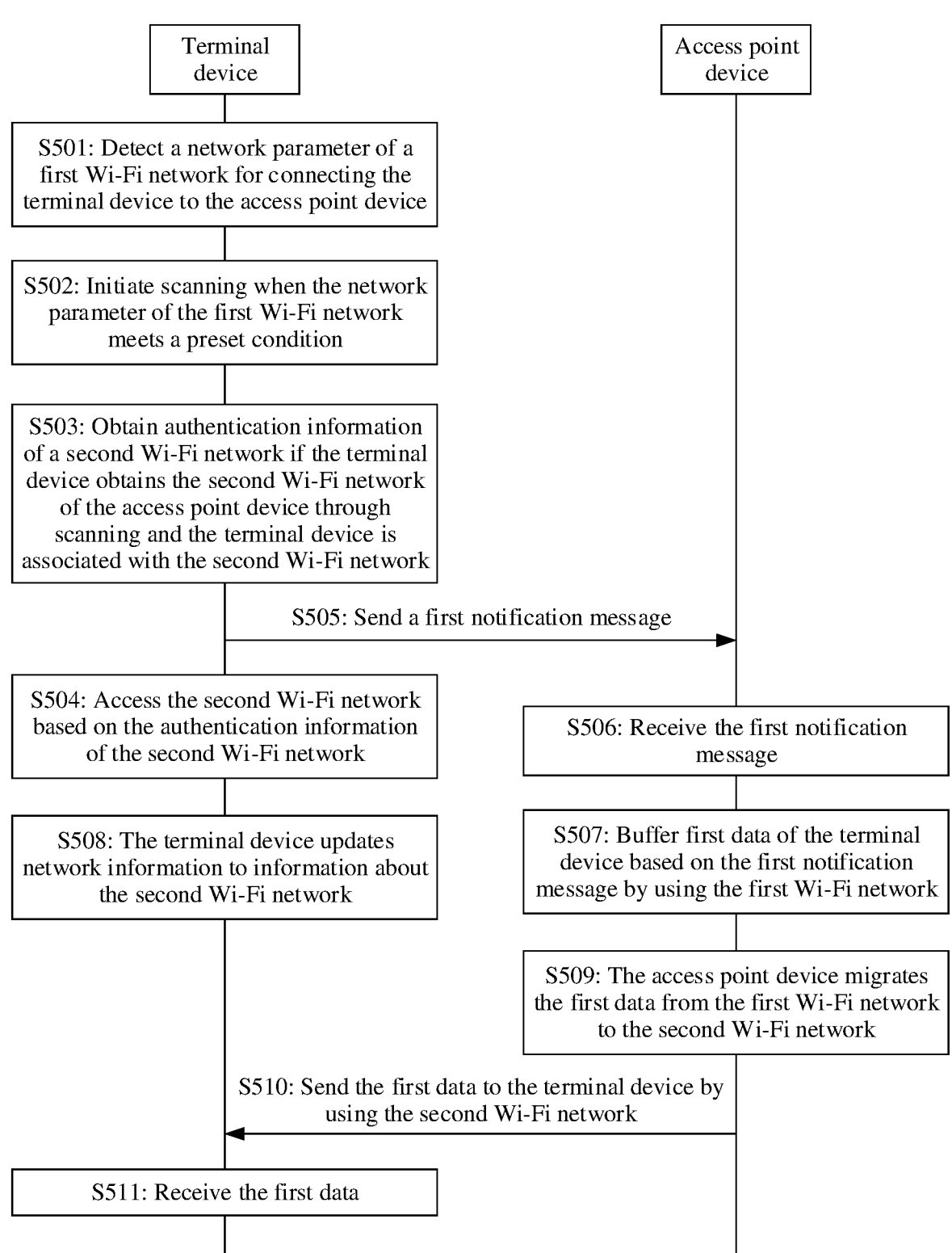
FIG. 8 is an example schematic flowchart of another network handover method according to an embodiment of this application.

As shown in FIG. 8, when an access point device supports management of data of a plurality of Wi-Fi networks, an embodiment of this application further provides a network handover method. In addition to the foregoing steps S501 to S508, the method may further include steps S509 to S511.

S509: The access point device migrates first data from a first Wi-Fi network to a second Wi-Fi network.

The first data is the data of the terminal device that is buffered by the access point device by using the first Wi-Fi network in step S507.

Optionally, the access point device may manage data of a plurality of networks, and the plurality of networks may be all networks of the access point device, or may be a part of networks of the access point device.

For example, the access point device is a dual-band router, the dual-band router supports a 2.4 GHz network and a 5 GHz network, and a network of a terminal device is handed over from the 5 GHz network of the dual-band router to the 2.4 GHz network. When the dual-band router supports management of data of the 2.4 GHz network and the 5 GHz network, the dual-band router may migrate data of the terminal device buffered in the 5 GHz network to the 2.4 GHz network.

S510: The access point device sends the first data to the terminal device by using the second Wi-Fi network.

For example, after the connection between the terminal device and the second Wi-Fi network is established, the access point device may send, to the terminal device by using the 2.4 GHz network, data of the terminal device that is buffered in the 5 GHz network, so that the terminal device does not lose a packet after network handover. This ensures complete normal communication and further improves user experience.

S511: The terminal device receives the first data.

For example, after network handover, the terminal device may receive the data buffered by the access point device in the original network, so that the data of the terminal device is not lost after network handover. This ensures normal communication of the terminal device and improves user experience.

According to the network handover method provided in this embodiment of this application, when the terminal device is handed over from the first Wi-Fi network of the access point device to the second Wi-Fi network of the access point device, the terminal device does not send a disassociation request to the access point device. Therefore, in a network handover process, the terminal device does not need to re-obtain an IP address, the network connection between the terminal device and the access point device is always not disconnected, and a problem such as a network disconnection of the terminal device does not occur. This can improve user experience. In addition, the terminal device sends, to the access point device, the first notification message indicating that the terminal device is in the low power consumption mode, so that the access point device can buffer the data of the terminal device. This avoids a problem that the access point device actively kicks off the terminal and disconnects the terminal when the terminal device receives no data that is sent by the access point device to the terminal device for a plurality of times because the first Wi-Fi network is poor, and further ensures that the network connection between the terminal device and the access point device is not disconnected. In addition, when the access point device supports management of data of a plurality of Wi-Fi networks, after the terminal device accesses the second Wi-Fi, the access point device may migrate data buffered by the access point device by using an original network (e.g., the first Wi-Fi network) to a new network (e.g., the second Wi-Fi network), and send the data by using the second Wi-Fi network, so that the terminal device can implement zero packet loss after network handover. This ensures complete normal communication and further improves user experience.

Figure 9A:
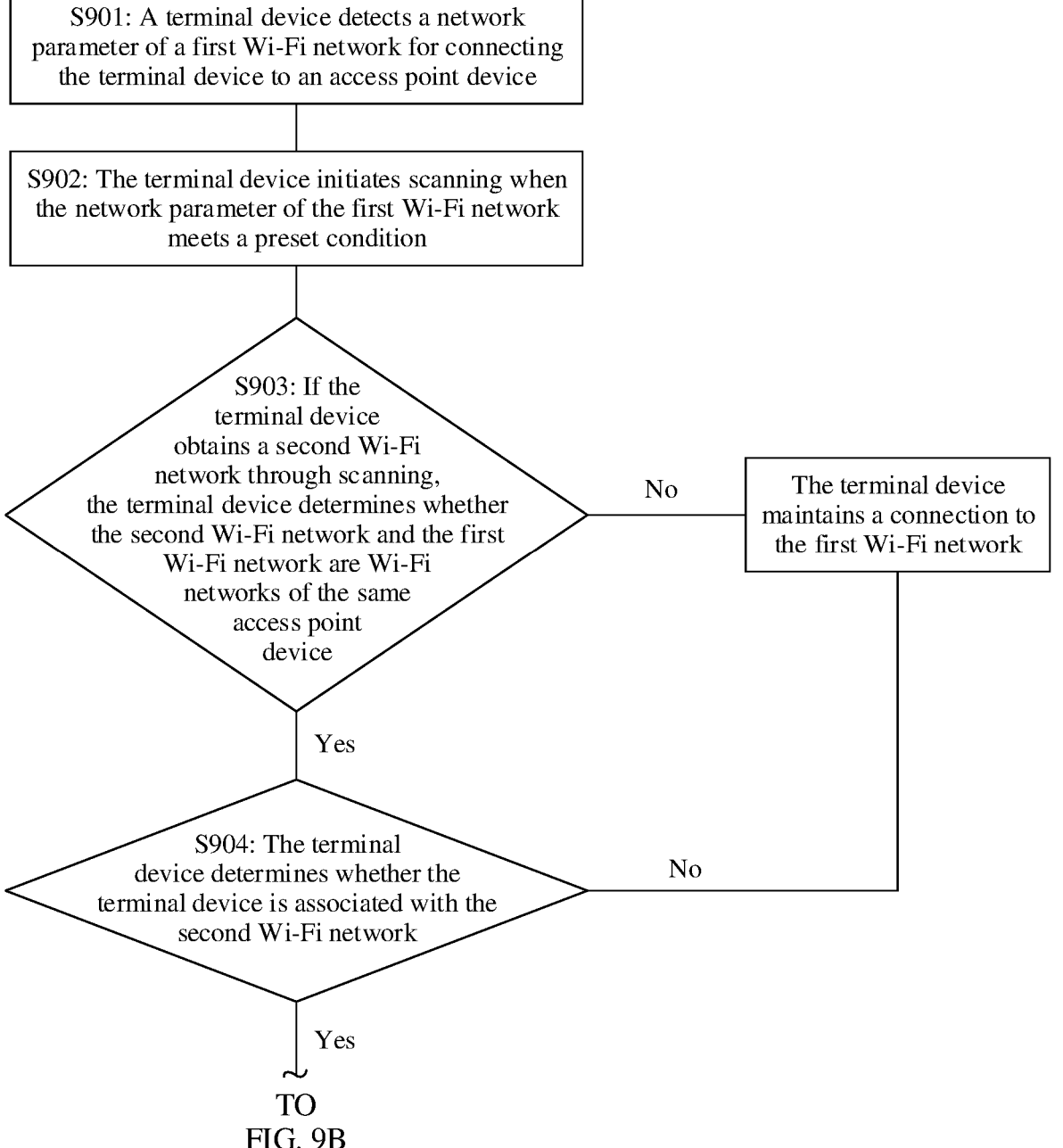

For example, FIG. 9A and FIG. 9B show a network handover method according to an embodiment of this application. The method is performed by a terminal device. The method may include the following steps.

S901: The terminal device detects a network parameter of a first Wi-Fi network for connecting the terminal device to an access point device.

S902: The terminal device initiates scanning when the network parameter of the first Wi-Fi network meets a preset condition.

It may be understood that, for specific implementations of steps S901 and S902, refer to the implementations of steps S501 and S502.

S903: If the terminal device obtains the second Wi-Fi network through scanning, the terminal device determines whether the second Wi-Fi network and the first Wi-Fi network are wireless networks of the same access point device.

When the terminal device determines that the second Wi-Fi network and the first Wi-Fi network are the wireless networks of the same access point device, the terminal device continues to perform step S904. When the terminal device determines that the second Wi-Fi network and the first Wi-Fi network are wireless networks of different access point devices, the terminal device maintains the connection to the first Wi-Fi network, and does not trigger network handover.

S904: The terminal device determines whether the terminal device is associated with the second Wi-Fi network.

When the terminal device determines that the terminal device is associated with the second Wi-Fi network, the terminal device continues to perform step S905. When the terminal device determines that the terminal device is not associated with the second Wi-Fi network, the terminal device maintains the connection to the first Wi-Fi network, and does not trigger network handover.

S905: The terminal device sends a first notification message to the access point device.

It may be understood that for a specific implementation of step S905, refer to the implementation of step S505.

S906: The terminal device obtains authentication information of the second Wi-Fi network, and accesses the second Wi-Fi network based on the authentication information of the second Wi-Fi.

It may be understood that for a specific implementation of step S906, refer to the implementations of steps S503 and S504.

S907: The terminal device determines whether the second Wi-Fi network is successfully accessed.

When the terminal device determines that the terminal device has successfully accessed the second Wi-Fi network, the terminal device continues to perform step S908. When the terminal device determines that the terminal device has not successfully accessed the second Wi-Fi network, the terminal device falls back to the first Wi-Fi network, and accesses the first Wi-Fi network.

Optionally, the second Wi-Fi network reuses an established protocol stack link between the terminal device and the first Wi-Fi network for communication.

S908: The terminal device updates network information to information about the second Wi-Fi network.

It may be understood that for a specific implementation of step S908, refer to the implementation of step S508.

S909: The terminal device receives first data.

It may be understood that for a specific implementation of step S909, refer to the implementation of step S511.

Optionally, when the access point device supports management of data of a plurality of networks, the access point device may migrate the first data of the terminal device buffered in the first Wi-Fi network to the second Wi-Fi network, and send the first data to the terminal device by using the second Wi-Fi network, and the terminal device may receive the first data, so that the terminal device does not lose a packet after network handover. This ensures complete normal communication, and further improves user experience.

It may be understood that a specific sequence of performing steps S901 to S909 is not limited in this embodiment of this application. FIG. 9A and FIG. 9B are merely an example for description.

According to the network handover method provided in this embodiment of this application, when the terminal device is handed over from the first Wi-Fi network of the access point device to the second Wi-Fi network of the access point device, the terminal device does not send a disassociation request to the access point device. Therefore, in a network handover process, the terminal device does not need to re-obtain an IP address, a network connection between the terminal device and the access point device is always not disconnected, and a problem such as a network disconnection of the terminal device does not occur. This can improve user experience. In addition, the terminal device sends, to the access point device, the first notification message indicating that the terminal device is in a low power consumption mode, so that the access point device can buffer the data of the terminal device. This avoids a problem that the access point device actively kicks off the terminal and disconnects the terminal when the terminal device receives no data that is sent by the access point device to the terminal device for a plurality of times because the first Wi-Fi network is poor, and further ensures that the network connection between the terminal device and the access point device is not disconnected. In addition, the terminal device may receive data buffered by the access point device in the first Wi-Fi network, so that the terminal device can implement zero packet loss after network handover. This ensures complete normal communication and further improves user experience.

The foregoing mainly describes, from a perspective of the steps of the methods, the solutions provided in embodiments of the present technology. It may be understood that, to implement the foregoing functions, a computer includes corresponding hardware structures and/or software modules for performing the functions. A person skilled in the art should be easily aware that, in combination with units and algorithm steps of the examples described in embodiments disclosed in this specification, this application may be implemented by a combination of hardware and computer software. A person skilled in the art may use different methods to implement the described functions for each particular application, but it should not be considered that the implementation goes beyond the scope of the present technology.

In embodiments of this application, the computer may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that in embodiments of the present technology, module division is an example, and is merely a logical function division. During actual implementation, another division manner may be used.

Figure 10:
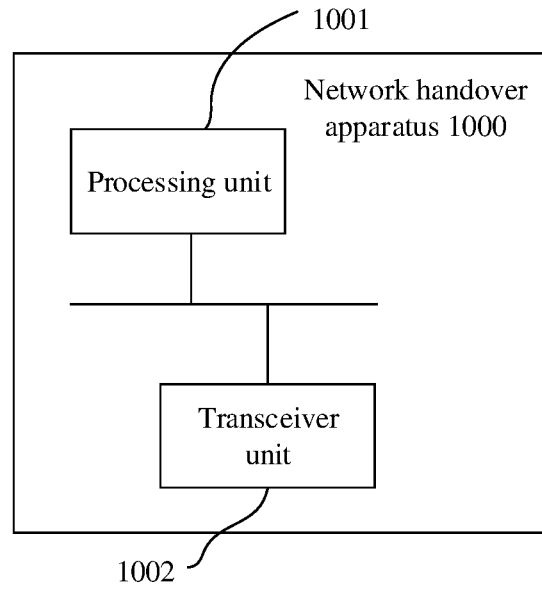
FIG. 10 is an example schematic diagram of a composition of a network handover apparatus according to an embodiment of this application.

FIG. 10 is a schematic diagram of a structure of a network handover apparatus 1000. The network handover apparatus 1000 may be the terminal device in the foregoing embodiments, or may be a chip in the foregoing terminal device.

The network handover apparatus 1000 includes a processing unit 1001 and a transceiver unit 1002. For example, the transceiver unit 1002 may be configured to support communication between the network handover apparatus 1000 and the access point device in the foregoing embodiments. The processing unit 1001 is configured to control and manage an action of the terminal device, and is configured to perform processing performed by the terminal device in the foregoing embodiments. Optionally, if the network handover apparatus 1000 includes a storage unit, the processing unit 1001 may further execute a program or instructions stored in the memory, so that the network handover apparatus 1000 implements the methods and the functions in any one of the foregoing embodiments.

For example, the processing unit 1001 may be configured to perform steps S501 to S504 in FIG. 5, or step S508 in FIG. 7, or steps S901 to S904 and S906 to S908 in FIG. 9A and FIG. 9B, and/or another process of the technology described in this specification. The transceiver unit 1002 may be configured to perform, for example, step S505 in FIG. 7, or step S511 in FIG. 8, or steps S905 and S909 in FIG. 9A and FIG. 9B, and/or another process of the technology described in this specification. All related content of the steps in the foregoing method embodiments may be cited in function descriptions of the corresponding functional modules.

For example, in hardware implementation, one processor may perform a function of the processing unit 1001, and a transceiver (a transmitter/a receiver) and/or a communication interface may perform a function of the transceiver unit 1002. The processing unit 1001 may be embedded in or independent of a processor of the network handover apparatus 1000 in a hardware form, or may be stored in a memory of the network handover apparatus 1000 in a software form, so that the processor invokes and performs operations corresponding to the foregoing functional units.

Figure 11:
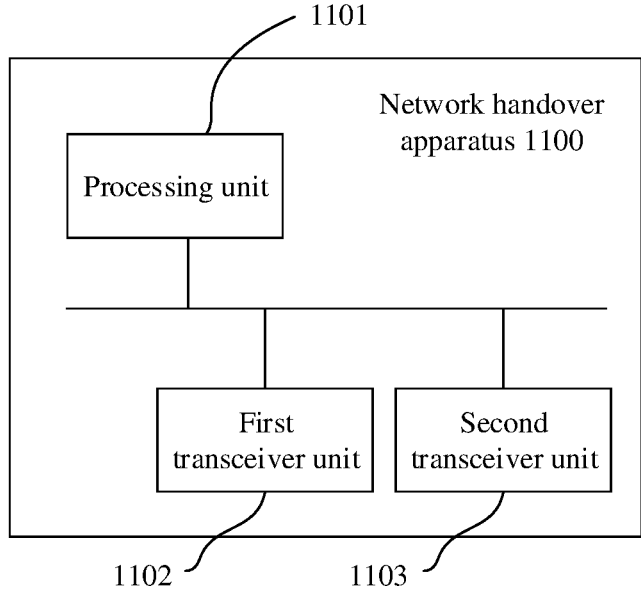
FIG. 11 is an example schematic diagram of a composition of another network handover apparatus according to an embodiment of this application.

FIG. 11 is a schematic diagram of a structure of a network handover apparatus 1100. The network handover apparatus may be the foregoing access point device, or may be a chip in the foregoing access point device. The network handover apparatus 1100 may be configured to implement the methods and the functions of the access point device (or the router) in any one of the foregoing embodiments.

The network handover apparatus 1100 includes a processing unit 1101, a first transceiver unit 1102, and a second transceiver unit 1103. The first transceiver unit 1102 is a transceiver unit for sending and receiving information in the second Wi-Fi network of the access point device, and the second transceiver unit 1103 is a transceiver unit for sending and receiving information in the first Wi-Fi network of the access point device. For example, the first transceiver unit 1102 and the second transceiver unit 1103 may be configured to support communication between the access point device and the terminal device in the foregoing embodiments. The processing unit 1101 is configured to control and manage an action of the access point device, and is configured to perform processing performed by the access point device in the foregoing embodiments. Optionally, if the network handover apparatus 1100 includes a storage unit, the processing unit 1101 may further execute a program or instructions stored in the memory, so that the network handover apparatus 1100 implements the methods and the functions in any one of the foregoing embodiments.

For example, the processing unit 1101 may be configured to perform, for example, step S507 in FIG. 7, or step S509 in FIG. 8, and/or another process of the technology described in this specification. The first transceiver unit 1102 may be configured to perform, for example, step S510 in FIG. 8, and/or another process of the technology described in this specification. The second transceiver unit 1103 may be configured to perform, for example, step S506 in FIG. 7, and/or another process of the technology described in this specification. All related content of the steps in the foregoing method embodiments may be cited in function descriptions of the corresponding functional modules.

For example, in hardware implementation, one or more processors may perform a function of the processing unit 1101, and a transceiver (a transmitter/a receiver) and/or a communication interface may perform a function of the first transceiver unit 1102 or the second transceiver unit 1103. The processing unit 1101 may be embedded or independent of a processor of the network handover apparatus 1100 in a hardware form, or may be stored in a memory of the network handover apparatus 1100 in a software form, so that the processor invokes and performs operations corresponding to the foregoing functional units.

Optionally, a function of the processing unit 1101 may be performed by one or more processors. When a function of the processing unit 1101 may be performed by a plurality of processors, the plurality of processors may be separately configured to perform corresponding functions in different wireless networks. For example, the network handover apparatus 1100 may include a first processor and a second processor. The first processor and the second processor respectively correspond to the first Wi-Fi network and the second Wi-Fi network. The first processor may be configured to process a related function of the first Wi-Fi network, and the second processor is configured to process a related function of the second Wi-Fi network.

An embodiment of this application further provides a terminal device. The terminal device includes a processor, and may further include a transceiver and a memory. The transceiver is configured to send and receive information, or is configured to communicate with another communication device. The memory is configured to store computer-executable instructions. The processor is configured to execute the computer-executable instructions, to support the terminal device in implementing the network handover method in any one of FIG. 5, FIG. 7, FIG. 8, and FIG. 9A and FIG. 9B.

An embodiment of this application further provides an access point device. The access point device includes a processor, and may further include a transceiver and a memory. The transceiver is configured to send and receive information, or is configured to communicate with another communication device. The memory is configured to store computer-executable instructions. The processor is configured to execute the computer-executable instructions, to support the access point device in implementing the network handover method in any one of FIG. 5, FIG. 7, or FIG. 8.

An embodiment of this application further provides a computer-readable storage medium. The computer-readable storage medium stores instructions. When the instructions are run on a computer, the computer is enabled to perform the network handover method in any one of the embodiments in FIG. 5, FIG. 7, FIG. 8, and FIG. 9A and FIG. 9B.

An embodiment of this application further provides a computer program product. When the computer program product runs on a computer, the computer is enabled to perform the network handover method in any one of the embodiments in FIG. 5, FIG. 7, FIG. 8, and FIG. 9A and FIG. 9B.

An embodiment of this application further provides a network handover apparatus. The apparatus may exist in a product form of a chip. A structure of the apparatus includes a processor and an interface circuit. The processor is configured to communicate with another apparatus by using a receiver circuit, so that the apparatus performs the network handover method in any one of the embodiments in FIG. 5, FIG. 7, FIG. 8, and FIG. 9A and FIG. 9B.

An embodiment of this application further provides a network handover system, including a terminal device and an access point device. The terminal device and the access point device may perform the network handover method in any one of the embodiments in FIG. 5, FIG. 7, or FIG. 8.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in the present technology may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The objectives, technical solutions, and beneficial effect of the present technology are further described in detail in the foregoing specific implementations. It should be understood that the foregoing descriptions are merely specific implementations of the present technology, but are not intended to limit the protection scope of the present technology. Any modification, equivalent replacement, or improvement made based on the technical solutions of the present technology shall fall within the protection scope of the present technology.

What is claimed is:

1. A network handover method, comprising:

detecting, by a terminal device, a network parameter, of a first wireless fidelity (Wi-Fi) network, for connecting the terminal device to an access point device;

initiating, by the terminal device, scanning in association with the network parameter of the first Wi-Fi network satisfying a first condition;

obtaining, by the terminal device, authentication information of a second Wi-Fi network based on the terminal device obtaining the second Wi-Fi network of the access point device through scanning and the terminal device being associated with the second Wi-Fi network, wherein service set identifiers (SSID) s of the second Wi-Fi network and the first Wi-Fi network are different; and accessing, by the terminal device and without re-obtaining an internet protocol (IP) address, the second Wi-Fi network based on the authentication information of the second Wi-Fi network, wherein the second Wi-Fi network is configured to reuse an established protocol stack link between the terminal device and the first Wi-Fi network for communication.

2. The method according to claim 1, wherein frequency bands of the first Wi-Fi network and frequency bands of the second Wi-Fi network are different.

3. The method according to claim 2, wherein a frequency band of the first Wi-Fi network includes any of 2.4 GHz, 5 GHZ, or 6 GHz, and a frequency band of the second Wi-Fi network includes any of 2.4 GHz, 5 GHZ, or 6 GHz.

4. The method according to claim 1, wherein the first Wi-Fi network is a home network, and the second Wi-Fi network is a guest network, or the first Wi-Fi network is a guest network, and the second Wi-Fi network is a home network.

5. The method according to claim 1, wherein before accessing the second Wi-Fi network, the method further comprises:

sending, by the terminal device, a first notification message to the access point device, wherein the first notification message indicates the terminal device is in a low power consumption mode.

6. The method according to claim 5, further comprising:

receiving, by the terminal device, first data sent by the access point device using the second Wi-Fi network, wherein the first data is buffered by the access point device using the first Wi-Fi network.

7. The method according to claim 1, wherein the terminal device initiates scanning based on channel information of the second Wi-Fi network.

8. The method according to claim 1, wherein the network parameter of the first Wi-Fi network meeting the first condition includes: quality of the first Wi-Fi network is lower than a first threshold or a transmission rate of the first Wi-Fi network is lower than a second threshold.

9. The method according to claim 1, further comprising:

updating, by the terminal device, network information to include information about the second Wi-Fi network.

10. A network handover method, comprising:

establishing, by a second wireless fidelity (Wi-Fi) network of an access point device, a connection to a terminal device; and reusing, by the second Wi-Fi network, an established protocol stack link between the terminal device and a first Wi-Fi network of the access point device for communication with the terminal device, without requiring the terminal device to re-obtain an internet protocol (IP) address, wherein service set identifiers (SSID) s of the second Wi-Fi network and the first Wi-Fi network are different.

11. The method according to claim 10, wherein frequency bands of the first Wi-Fi network and frequency bands the second Wi-Fi network are different.

12. The method according to claim 11, wherein a frequency band of the first Wi-Fi network includes any of 2.4 GHz, 5 GHZ, or 6 GHz, and a frequency band of the second Wi-Fi network includes any of 2.4 GHz, 5 GHZ, or 6 GHz.

13. The method according to claim 10, wherein before establishing the connection to the terminal device, the method further comprises:

receiving, by the access point device, a first notification message from the terminal device, wherein the first notification message indicates the terminal device is in a low power consumption mode; and buffering, by the access point device, first data of the terminal device, based on the first notification message, by using the first Wi-Fi network.

14. The method according to claim 13, further comprising:

migrating, by the access point device, the first data from the first Wi-Fi network to the second Wi-Fi network; and sending, by the access point device, the first data to the terminal device by using the second Wi-Fi network.

15. A terminal device, comprising:

a transceiver;

a processor; and a memory configured to store computer readable instructions that, when executed by the processor, cause the terminal device to:

detect a network parameter, of a first wireless fidelity (Wi-Fi) network, for connecting the terminal device to an access point device;

initiate scanning when the network parameter of the first Wi-Fi network first condition;

obtain authentication information of a second Wi-Fi network based on the terminal device obtaining the second Wi-Fi network of the access point device through scanning and the terminal device being associated with the second Wi-Fi network, wherein service set identifiers (SSID) s of the second Wi-Fi network and the first Wi-Fi network are different; and access, without re-obtaining an internet protocol (IP) address, the second Wi-Fi network based on the authentication information of the second Wi-Fi network by using the transceiver, wherein the second Wi-Fi network is configured to reuse an established protocol stack link between the terminal device and the first Wi-Fi network for communication.

16. The terminal device according to claim 15, wherein frequency bands of the first Wi-Fi network and frequency bands of the second Wi-Fi network are different, a frequency band of the first Wi-Fi network includes any of 2.4 GHZ, 5 GHz, or 6 GHZ, and a frequency band of the second Wi-Fi network includes any of 2.4 GHZ, 5 GHZ, or 6 GHZ.

17. The terminal device according to claim 15, wherein the terminal device is further caused to:

send a first notification message to the access point device, wherein the first notification message indicates the terminal device is in a low power consumption mode.

18. The method according to claim 1, wherein in association with accessing the second Wi-Fi network, the terminal device only performs frame interaction in a Wi-Fi network access procedure and does not need to re-obtain the IP address.

19. The method according to claim 1, wherein the first data is migrated from the first Wi-Fi network to the second Wi-Fi network using the access point device, and the method further comprises:

receiving, by the terminal device, the first data from the access point device by using the second Wi-Fi network.

20. The terminal device according to claim 15, wherein the first data is migrated from the first Wi-Fi network to the second Wi-Fi network using the access point device, and the terminal device is further caused to:

receive the first data from the access point device by using the second Wi-Fi network.

* * * * *